United States Patent
Krymski

(10) Patent No.: US 9,019,411 B2
(45) Date of Patent: Apr. 28, 2015

(54) IMAGE SENSORS AND METHODS WITH PIPELINED READOUT

(71) Applicant: Alexander Krymski, Pasadena, CA (US)

(72) Inventor: Alexander Krymski, Pasadena, CA (US)

(*) Notice: Subject to any disclaimer, the term of this patent is extended or adjusted under 35 U.S.C. 154(b) by 291 days.

(21) Appl. No.: 13/648,067

(22) Filed: Oct. 9, 2012

(65) Prior Publication Data

US 2013/0027594 A1 Jan. 31, 2013

Related U.S. Application Data

(63) Continuation-in-part of application No. 12/433,711, filed on Apr. 30, 2009, now Pat. No. 8,310,578.

(60) Provisional application No. 61/049,741, filed on May 1, 2008.

(51) Int. Cl.
| | |
|---|---|
| *H04N 3/14* | (2006.01) |
| *H04N 5/335* | (2011.01) |
| *H04N 5/217* | (2011.01) |
| *H04N 5/374* | (2011.01) |
| *H04N 5/378* | (2011.01) |

(52) U.S. Cl.
CPC ............ *H04N 5/3742* (2013.01); *H04N 5/378* (2013.01)

(58) Field of Classification Search
CPC ....... H04N 5/378; H04N 5/374; H04N 5/335; H04N 5/37452; H04N 5/3575; H04N 5/361
USPC ................... 348/308, 241, 294, 256; 257/445
See application file for complete search history.

(56) References Cited

U.S. PATENT DOCUMENTS

| | | |
|---|---|---|
| 5,757,520 A | 5/1998 | Takashima |
| 6,115,065 A | 9/2000 | Yadid-Pecht et al. |
| 6,545,624 B2 | 4/2003 | Lee et al. |
| 6,552,745 B1 | 4/2003 | Perner |
| 6,573,936 B2 | 6/2003 | Morris et al. |
| 6,670,904 B1 | 12/2003 | Yakovlev |
| 6,870,565 B1 | 3/2005 | Blerkom et al. |

(Continued)

FOREIGN PATENT DOCUMENTS

JP 2001-024954 1/2001

OTHER PUBLICATIONS

A. Krymski et al., "A High Speed, 500 Frames/s, 1024×1024 CMOS Active Pixel Sensor", 1999 Symposium on VLSI Circuits Digest of Technical Papers, 1999, Kyoto, Japan, pp. 137-138.

(Continued)

*Primary Examiner* — Alicia M Harrington
(74) *Attorney, Agent, or Firm* — Foley & Lardner LLP

(57) ABSTRACT

A pipelined readout method in an image sensor includes receiving one or more signals from a pixel of a row of a pixel array into a column storage at least partially during a time that a previously sampled amplified output of the column storage that is based on signals provided by a previous pixel of a previously read out row of the pixel array is converted from analog to digital by an analog-to-digital conversion circuit. The method further includes performing, by the analog-to-digital conversion circuit, analog-to-digital conversion of a sampled amplified output of the column storage that is based on the one or more signals from the pixel at least partially during a time that the column storage receives at least one signal from a another pixel of a subsequently read out row of the pixel array.

7 Claims, 17 Drawing Sheets

(56) References Cited

U.S. PATENT DOCUMENTS

| | | |
|---|---|---|
| 6,953,923 B2 | 10/2005 | Yang et al. |
| 7,205,522 B2 | 4/2007 | Krymski |
| 7,238,977 B2 | 7/2007 | Hong et al. |
| 7,336,214 B2 | 2/2008 | Krymski |
| 7,400,279 B2 | 7/2008 | Krymski |
| 7,443,437 B2 | 10/2008 | Altice et al. |
| 7,471,324 B2 | 12/2008 | Tu et al. |
| 7,488,928 B2 | 2/2009 | Krymski |
| 7,659,925 B2 | 2/2010 | Krymski |
| 7,804,438 B2 | 9/2010 | Krymski |
| 7,876,362 B2 | 1/2011 | Krymski |
| 7,880,786 B2 | 2/2011 | Muramatsu |
| 8,174,603 B2 | 5/2012 | Krymski |
| 2003/0011829 A1 | 1/2003 | Dierickx |
| 2003/0043089 A1 | 3/2003 | Hanson et al. |
| 2004/0021787 A1 | 2/2004 | Cho |
| 2005/0237408 A1 | 10/2005 | Muramatsu |
| 2006/0158541 A1* | 7/2006 | Ichikawa ............... 348/308 |
| 2007/0076109 A1 | 4/2007 | Krymski |
| 2007/0139242 A1 | 6/2007 | Krymski |

OTHER PUBLICATIONS

PCT International Search Report and Written Opinion report dated Aug. 29, 2007, from PCT application PCT/US06/38643.

S. Kleinfelder et al., "A 10,000 Frames/s CMOS Digital Pixel Sensor", IEEE Journal of Solid State Circuits, vol. 36, No. 12, pp. 2049-2059, Dec. 2001.

US Notice of Allowance for U.S. Appl. No. 12/433,711, dated Jul. 26, 2012.

US Office Action for U.S. Appl. No. 12/433,711, dated Apr. 11, 2012.

US Office Action for U.S. Appl. No. 12/433,711, dated Sep. 19, 2011.

* cited by examiner

FIG. 15B

Reset the amplifier during a time when the column analog-to-digital conversion circuit performs the analog-to-digital conversion of the sampled amplified difference signal — 705

FIG. 15C

Amplify, using the amplifier, a second output of the column storage that represents a difference between signals read from the pixel of the second row of the pixel array to provide a second amplified difference signal — 706

Sample the second amplified difference signal with the column analog-to-digital conversion circuit — 707

Perform analog-to-digital conversion of the sampled second amplified difference signal using the column analog-to-digital conversion circuit at least partially during a time when another signal from a pixel of a third row of the pixel array is read into the column storage — 708

US 9,019,411 B2

IMAGE SENSORS AND METHODS WITH PIPELINED READOUT

CROSS-REFERENCE TO RELATED PATENT APPLICATIONS

This application is a continuation-in-part of U.S. patent application Ser. No. 12/433,711, filed Apr. 30, 2009, which claims the benefit of U.S. Provisional Patent App. Ser. No. 61/049,741, filed May 1, 2008, the entire contents of both of which are incorporated by reference herein.

BACKGROUND OF THE INVENTION

1. Field of the Invention

Embodiments of the present invention relate generally to image sensors and methods and, in specific embodiments, to image sensors with column readout circuits.

2. Related Art

Image sensors have found wide application in consumer and industrial electronics, and have enabled an explosion in a number of digital cameras and digital video devices used for work and entertainment. In many applications, and especially in industrial applications, there is a constant demand for image sensors with faster processing speed and better image quality. Thus, it is advantageous to develop new circuits and techniques that allow for improved performance of image sensors.

FIG. 1 illustrates an architecture of a related art image sensor 1. As illustrated in FIG. 1, the image sensor 1 comprises a pixel array 8, a row driver 29, an analog-to-digital conversion (ADC) controller 85 and a plurality of column readout circuits 86. The pixel array 8 comprises pixels 2 that are arranged in rows and columns. Each pixel 2 comprises a light sensitive element, such as a photodiode, or the like, to sample light intensity of a corresponding portion of a scene being imaged, and each pixel 2 is configured to produce an analog pixel signal based on the sampled light intensity. The row driver 29 supplies control signals to the pixels 2 in the pixel array 8 to control an operation of the pixels 2.

Pixels 2 that are in a same row of the pixel array 8 share common row control signals from the row driver 29. For example, pixels 2 in a first row of the pixel array 8 share common row control lines $21_1$ for receiving control signals from the row driver 29. Similarly, pixels 2 in a second row of the pixel array 8 share common row control lines $21_2$ for receiving control signals from the row driver 29, and pixels 2 in an $h^{th}$ row of the pixel array 8 share common row control lines $21_h$ for receiving control signals from the row driver 29. Pixels 2 that are in a same column of the pixel array 8 may share a common column readout line to provide output. For example, pixels 2 in a first column of the pixel array 8 share a column readout line $22_1$, pixels 2 in a second column of the pixel array 8 share a column readout line $22_2$, and pixels 2 in an $m^{th}$ column of the pixel array 8 share a column readout line $22_m$. The row driver 29 controls the pixels 2 to provide output row by row.

Further examples of related art image sensors are disclosed in the following references:
(i) U.S. Pat. No. 6,870,565 entitled "Semiconductor Imaging Sensor Array Devices with Dual-Port Digital Readout", the entire contents of which are incorporated by reference herein;
(ii) U.S. Patent App. Pub. No. 2003/0043089 entitled "Doubling of Speed in CMOS Sensor with Column-Parallel ADCs", the entire contents of which are incorporated by reference herein; and
(iii) A. Krymski et al., "A High Speed, 500 Frames/s, 1024× 1024 CMOS Active Pixel Sensor", 1999 *Symposium on VLSI Circuits Digest of Technical Papers,* 1999, Kyoto, Japan, pp. 137-138, the entire contents of which are incorporated by reference herein.

FIG. 2 illustrates an example of a design of the pixel 2. The pixel 2 in FIG. 2 is typically called a four transistor (4T) pixel. The pixel 2 includes a photodiode 11, a transfer transistor 112, a sense node 13, a reset transistor 114, a source follower transistor 116, and a row select transistor 118. The transfer transistor 112, the reset transistor 114, the source follower transistor 116, and the row select transistor 118 may each comprise, for example, an n-channel metal-oxide semiconductor field effect transistor (NMOS transistor), or the like.

The pixel 2 illustrated in FIG. 2 is provided as an example of a pixel in an $n^{th}$ row and a $j^{th}$ column of a pixel array, such as the pixel array 8 (refer to FIG. 1), and the pixel 2 receives a transfer signal (tx) over a transfer signal line $21_{n1}$, a reset signal (rst) over a reset signal line $21_{n2}$, and a row select signal (rowsel) over a row select signal line $21_{n3}$. The transfer signal line $21_{n1}$, the reset signal line $21_{n2}$, and the row select signal line $21_{n3}$ are shared by all pixels in an $n^{th}$ row of a pixel array, such as the pixel array 8 (refer to FIG. 1), and the transfer signal (tx), the reset signal (rst), and the row select signal (rowsel) are provided from a row driver, such as the row driver 29 (refer to FIG. 1). The pixel 2 in FIG. 2 provides output to a column readout line $22_j$.

As illustrated in FIG. 2, the photodiode 11 is a buried type photodiode with a substrate serving as an anode and an n⁻ plate of the photodiode 11 is connected to a source of the transfer transistor 112. A gate 12 of the transfer transistor 112 is connected to the transfer signal line $21_{n1}$, and the gate 12 of the transfer transistor 112 may also be called the transfer gate 12. A drain of the transfer transistor 112 is connected to the sense node 13. A source of the reset transistor 114 is connected to the sense node 13, and a drain of the reset transistor 114 is connected to a supply voltage ($V_{dd}$) provided from a power supply (not shown). A gate 14 of the reset transistor 114 is connected to the reset signal line $21_{n2}$, and the gate 14 of the reset transistor 114 may also be called the reset gate 14.

A drain of the source follower transistor 116 is connected to the supply voltage ($V_{dd}$) provided from the power supply (not shown), and a source of the source follower transistor 116 is connected to a drain of the row select transistor 118. A gate 16 of the source follower transistor 116 is connected to the sense node 13. A source 19 of the row select transistor 118 is connected to the column readout line $22_j$, and the source 19 of the row select transistor 118 may also be called the pixel output area 19. The pixel output area 19 provides a pixel output (pout) signal to the column readout line $22_j$. A gate 18 of the row select transistor 118 is connected to the row select signal line $21_{n3}$.

With reference again to FIG. 1, each column readout circuit 86 is connected to receive analog signals from a corresponding column readout line, and is configured to provide digital output on a corresponding output line. For example, the column readout circuit 86 for the first column is connected to the column readout line $22_1$ for receiving input, and is connected to an output line $82_1$ for providing output. Similarly, the column readout circuit 86 for the second column is connected to the column readout line $22_2$ for receiving input, and is connected to an output line $82_2$ for providing output, and the column readout circuit 86 for the $m^{th}$ column is connected to the column readout line $22_m$ for receiving input, and is connected to an output line $82_m$ for providing output. The ADC controller 85 is configured to provide control signals to the plurality of column readout circuits 86 over one or more control lines 83.

FIG. 3 illustrates a portion of the related art image sensor 1 (refer to FIG. 1) with circuitry for performing readout from a $j^{th}$ column of the pixel array 8 (refer to FIG. 1). As illustrated in FIG. 3, the column readout circuit 86 for the $j^{th}$ column is connected to receive pixel output (pout) signals over the column readout line $22_j$, and is connected to receive control signals from the ADC controller 85 (refer to FIG. 1) including: (1) an amplifier reset (amprst) signal over a control line $83_1$; (2) an ADC autozero signal (ADC autozero) over a control line $83_2$; (3) a sample and hold signal (S/H into ADC) over a control line $83_3$; and (4) an ADC conversion signal (ADC conversion) over a control line $83_4$. The column readout circuit 86 provides output over an output line $82_j$.

The column readout circuit 86 includes a current sink transistor 91, a capacitor 92, a feedback capacitor 93, a switch 94, an amplifier 95, and a column ADC circuit 96. A first terminal of the current sink transistor 91 is connected to the column readout line $22_j$, and a second terminal of the current sink transistor 91 is connected to a fixed voltage, such as ground or another suitable voltage. A gate of the current sink transistor 91 is connected to a voltage $V_{1n}$. A first terminal of the capacitor 92 is connected to the column readout line $22_j$, and a second terminal of the capacitor 92 is connected to a negative input of the amplifier 95. A first terminal of the feedback capacitor 93 is connected to the negative input of the amplifier 95, and a second terminal of the feedback capacitor 93 is connected to an output of the amplifier 95. A first terminal of the switch 94 is connected to the negative input of the amplifier 95, and a second terminal of the switch 94 is connected to an output of the amplifier 95. The switch 94 is controlled by the amplifier reset (amprst) signal provided on the control line $83_1$.

The output of the amplifier 95 is connected to the column ADC circuit 96. The column ADC circuit 96 is also connected to the control lines $83_2$, $83_3$, and $83_4$, for receiving the ADC autozero signal, the S/H into ADC signal, and the ADC conversion signal, respectively. The column ADC circuit 96 is configured to perform an autozero operation in accordance with the ADC autozero signal. The column ADC circuit 96 is configured to sample and hold an output from the amplifier 95 in accordance with the S/H into ADC signal. The column ADC circuit 96 is configured to perform analog-to-digital conversion of an analog signal in accordance with the ADC conversion signal and to provide the digital result as output on the output line $82_j$.

FIG. 4A illustrates a signal timing chart for a related art pixel readout scheme. With reference to FIGS. 1, 2, 3, and 4A, the related art pixel readout scheme proceeds as follows during a row (line) time for a row n:

(a) the row driver 29 provides a HIGH signal for rst on the reset signal line $21_{n2}$ to reset the sense node 13 of each pixel 2 in the row n, the ADC controller 85 provides a HIGH signal for amprst on the control line $83_1$ to reset the amplifier 95 of each column readout circuit 86, and the ADC controller 85 provides a HIGH signal for ADC autozero on the control line $83_2$ to cause the column ADC circuit 96 of each column readout circuit 86 to perform an autozero function;

(b) the row driver 29 provides a HIGH signal for tx on the transfer signal line $21_{n1}$ to start a charge transfer process from the photodiode 11 to the sense node 13 in each pixel 2 in the row n;

(c) the ADC controller 85 provides a HIGH signal for S/H into ADC on the control line $83_3$, at which time a signal value for each pixel in the row n can be provided over the corresponding column readout line to the corresponding column readout circuit 86, such that a difference between the signal value and the stored reset value is amplified by the amplifier 95 and sampled and held by the column ADC circuit 96; and (d) the ADC controller 85 provides a HIGH signal for ADC conversion on the control line $83_4$ to cause the column ADC circuit 96 of each of the column readout circuits 86 to perform analog-to-digital conversion of the sampled and held value.

As illustrated in FIG. 4A, once the pixel readout scheme has completed readout for a row n, the readout starts for a next row (n+1), and the readout scheme is repeated during that next row (line) time for the row (n+1). The readout continues in that fashion, row-by-row, for all rows in the pixel array 8 (refer to FIG. 1).

FIG. 4B provides a generalized description of a related art column readout scheme. With reference to FIGS. 1, 3, and 4B, in various complimentary metal oxide semiconductor (CMOS) image sensor readout schemes, a photo-signal from a pixel, such as each of the pixels 2, is represented with two voltage signals that are read out with one following another from the pixel. For simplicity, the two pixel signals output from the pixel can be called "sig1" and "sig2." One of the pixel signals (either sig1 or sig2) from a pixel represents a value of an empty sense node or readout node in the pixel after the pixel has been reset, and the other of the pixel signals (the other of sig1 or sig2) represents a value of the same sense node as filled with photo-charge from an exposure. The order of whether the reset signal is read out first (as sig1) or second (as sig2) depends on the details of the pixel implementation.

At the beginning of a first row time (denoted as "Row 1" in FIG. 4B) a sig1 is read out from each pixel, such as the pixels 2, in a first row of a pixel array. Also, an amplifier in each column readout circuit, such as the amplifier 95, is reset (denoted "amprst" in FIG. 4B), and a column ADC circuit in each column readout circuit, such as the column ADC circuit 96, is autozeroed (denoted "ADC AZ" in FIG. 4B). Then, a sig2 is read out from each pixel, such as the pixels 2, in the first row of the pixel array. A difference between the signals sig1 and sig2 is amplified (denoted "amp" in FIG. 4B) by the corresponding amplifier, such as the amplifier 95, in each column readout circuit, and the amplified difference of the signals is sampled and held (denoted "ADC SH" in FIG. 4B) by the corresponding column ADC circuit, such as the column ADC circuit 96, in each column readout circuit. During the remaining time of the first row time, the amplified and sampled and held difference of sig1 and sig2 is converted from analog to a digital value (denoted "ADC conv" in FIG. 4B) by the corresponding column ADC circuit, such as the column ADC circuit 96, in each column readout circuit.

Once the analog to digital conversion is complete for signals from the first row, the first row time ends, and then a second row time (denoted "Row 2" in FIG. 4B) begins. During the second row time, similar operations are performed as were performed during the first row time, but the signals sig1 and sig2 are obtained from pixels in a second row of the pixel array rather than the first row. Once the analog to digital conversion is complete for signals from the second row, the second row time ends, and then a third row time (denoted "Row 3" in FIG. 4B) begins. During the third row time, similar operations are performed as were performed during the first row time, but the signals sig1 and sig2 are obtained from pixels in a third row of the pixel array rather than the first row. The process then continues for each row in the pixel array.

In the readout scheme of FIG. 4A and the readout scheme of FIG. 4B, approximately one-half of the row (line) time is available for pixel operations, and the other half of the row time is devoted to analog-to-digital conversion. During the row operations, time is needed for the pixel operations, such as pixel reset and pixel charge transfer, and time is also needed for settling of the pixel, the column readout line, and the amplifier after completing the pixel operation. As a result, in the readout schemes of FIG. 4A and FIG. 4B, the time allocated to a particular row operation (such as pixel reset or pixel charge transfer) may be insufficient to fully complete that particular row operation. This may cause image non-uniformities and excessive noise from incomplete correlated double sampling (CDS). Such problems become worse in high speed image sensors with limited row times.

SUMMARY OF THE DISCLOSURE

Image sensors and methods in accordance with various embodiments allow for sig1 and sig2 readout phases from pixels to be extended to last for one row time combined, so that pixel transfer time can be extended. In various embodiments, column ADC circuit autozeroing is removed from each row time and is performed only once a frame. For example, in some embodiments, column ADC circuit autozeroing is performed only in a first row time while resetting an amplifier for each column readout circuit. By removing column ADC circuit autozeroing from the row operations, analog-to-digital conversion may last considerably longer than a half of a row time.

Image sensors and methods in accordance with various embodiments have a pipelined readout, which allows for allocating more time to pixel operations and analog-to-digital conversion. In some embodiments, a sequence of operations for one frame is as follows:

(a) The frame starts with a vertical blank period. For example, global pixel operations are performed, such as in the case of a global shutter pixel.

(b) During a first row time (Row1) operations are performed for a first row in a pixel array. The Row1 operations include reading sig1 from the pixels in the first row of the pixel array while resetting the amplifier in each column readout circuit and performing ADC autozero for the column ADC circuit in each column readout circuit. The Row1 operations also include reading sig2 from the pixels in the first row, amplifying the difference (sig1−sig2) in the amplifier of the corresponding column readout circuit and sampling the result to the corresponding column ADC circuit.

(c) During a second row time (Row2) operations are performed for a second row in a pixel array, and analog-to-digital conversion is performed for the sampled difference signals from the first row of the pixel array. From the beginning of Row2, the image sensor in various embodiments performs two parallel operations: (i) analog-to-digital conversion of the amplified and sample-and-held difference sig1−sig2 of the first row by each column ADC circuit; and (ii) reading sig1 from the pixels in the second row of the pixel array while resetting the amplifier in each column readout circuit followed with reading sig2 from the pixels in the second row and amplifying the difference sig1−sig2 in the amplifier of the corresponding column readout circuit. At the end of the Row2, when the analog-to-digital conversion of each of the difference signals for the pixels is row one is finished, the amplified difference of sig1−sig2 for each pixel of the second row is sampled into the corresponding column ADC circuit.

(d) During the third row time (Row3) and each row time thereafter up to the row time (RowN) for the last row, the operations are performed as in Row2, but the sig1 and sig2 read from the pixel array are read from the corresponding row in the pixel array (e.g., from the third row for Row3 and from the $N^{th}$ row for RowN).

(e) During an $(N+1)^{th}$ row time (RowN+1), the analog-to-digital conversion of the amplified difference (sig1−sig2) for each of the pixels of Row N in the pixel array is performed by the corresponding column ADC circuit. The readout may then continue with another frame.

A method in accordance with an embodiment includes (a) reading out a first signal and a second signal over a column readout line from a pixel that is located in a row of a pixel array; and (b) performing, by an analog-to-digital conversion circuit, analog-to-digital conversion of a signal that is obtained using the first signal and the second signal, where the analog-to-digital conversion is performed at least partially during a time that one or more signals are read out over the column readout line from another pixel that is located in a different row of the pixel array than the row. In various embodiments, the method further includes performing, by the analog-to-digital conversion circuit, analog-to-digital conversion of another signal that is obtained using the one or more signals. In some embodiments, the method further includes amplifying, by an amplifier, a particular signal that represents a difference between the first signal and the second signal to obtain the signal. Also, in some embodiments, the method further includes resetting the amplifier during at least part of a time when the analog-to-digital conversion of the signal is being performed.

A pipelined readout method in an image sensor in accordance with an embodiment includes receiving one or more signals from a pixel of a row of a pixel array into a column storage at least partially during a time that a previously sampled amplified output of the column storage that is based on signals provided by a previous pixel of a previously read out row of the pixel array is converted from analog to digital by an analog-to-digital conversion circuit. In various embodiments, the method further includes performing, by the analog-to-digital conversion circuit, analog-to-digital conversion of a sampled amplified output of the column storage that is based on the one or more signals from the pixel at least partially during a time that the column storage receives at least one signal from another pixel of a subsequently read out row of the pixel array. In some embodiments, the column storage is a capacitor. Also, in some embodiments, amplification for the previously sampled amplified output of the column storage is provided by an amplifier that is connected between the column storage and the analog-to-digital conversion circuit. In various embodiments, the method further includes resetting the amplifier at least partially during a time that the analog-to-digital conversion circuit performs the analog-to-digital conversion of the sampled amplified output of the column storage.

A method in accordance with an embodiment includes reading a first signal from a pixel of a first row of a pixel array into a column storage while resetting an amplifier and autozeroing a column analog-to-digital conversion circuit. In various embodiments, the method further includes reading a second signal from the pixel of the first row into the column storage and amplifying an output of the column storage that represents a difference between the first signal and the second signal using the amplifier to provide an amplified difference signal. In some embodiments, the method includes sampling the amplified difference signal with the column analog-to-digital conversion circuit. Also, in some embodiments the method includes performing analog-to-digital conversion of the sampled amplified difference signal using the column analog-to-digital conversion circuit at least partially during a time when a signal from a pixel of a second row of the pixel array is read into the column storage.

In various embodiments, the method further includes resetting the amplifier during a time when the column analog-to-digital conversion circuit performs the analog-to-digital conversion of the sampled amplified difference signal. In some embodiments, a total time period for the reading of the first signal and the second signal from the pixel of the first row into the column storage is equal to one row time period, and the analog-to-digital conversion of the sampled amplified difference signal lasts for longer than one-half of the row time period. In some embodiments, signals from pixels in the pixel array are read out row by row during one frame, and the autozeroing of the column analog-to-digital conversion circuit is performed only once per frame.

In some embodiments, the method further includes amplifying, using the amplifier, a second output of the column storage that represents a difference between signals read from the pixel of the second row of the pixel array to provide a second amplified difference signal. Also, in some embodiments, the method further includes sampling the second amplified difference signal with the column analog-to-digital conversion circuit, and performing analog-to-digital conversion of the sampled second amplified difference signal using the column analog-to-digital conversion circuit at least partially during a time when another signal from a pixel of a third row of the pixel array is read into the column storage.

An image sensor in accordance with an embodiment includes a pixel array, a column readout circuit, and a controller. The pixel array includes a plurality of pixels arranged in a plurality of rows and a plurality of columns. The column readout circuit includes an amplifier, a column storage connected to an input of the amplifier, and an analog-to-digital conversion circuit connected to an output of the amplifier. The controller is configured to control the column readout circuit such that at least partially during a time that one or more signals are read from a pixel of a row of the pixel array into the column storage a previously sampled amplified output of the column storage that is based on signals provided by a previous pixel of a previously read out row of the pixel array is converted from analog to digital by the analog-to-digital conversion circuit.

In various embodiments, the column storage is a capacitor. In some embodiments, the controller is configured to control the column readout circuit such that the analog-to-digital conversion circuit performs analog-to-digital conversion of a sampled amplified output of the column storage that is based on the one or more signals from the pixel at least partially during a time that the column storage receives at least one signal from a another pixel of a subsequently read out row of the pixel array. In various embodiments, the controller is configured to reset the amplifier and autozero the analog-to-digital conversion circuit at least partially during a time that a first signal from a pixel of a first row of the pixel array is read into the column storage.

In some embodiments, signals from pixels in the pixel array are read out row by row during one frame, and the controller is configured to control the column readout circuit such that the autozeroing of the analog-to-digital conversion circuit is performed only once per frame. In various embodiments, a total time period for the reading of the one or more signals from the pixel of the row of the pixel array into the column storage is equal to one row time period, and the controller is configured to control the column readout circuit such that the analog-to-digital conversion of the previously sampled amplified output of the column storage lasts for longer than one-half of the row time period. In some embodiments, the controller is configured to reset the amplifier during a time when the analog-to-digital conversion circuit performs the analog-to-digital conversion of the previously sampled amplified output of the column storage.

In various embodiments, the controller is configured to control the analog-to-digital conversion circuit to perform analog-to-digital conversion of a signal representative of signals output from a pixel in a last row of the pixel array during a time when no signals are read out from the pixel array into the column storage. In some embodiments, the analog-to-digital conversion circuit is controllable by the controller to sample and hold an output of the amplifier. Also, in some embodiments, the column storage is a capacitor that is connected to a column readout line for receiving signals from all pixels in a column of the pixel array.

BRIEF DESCRIPTION OF THE DRAWINGS

FIG. 15B illustrates a flowchart of a method that can be used with the method of FIG. 15A; and FIG. 15C illustrates a flowchart of a method that can be used with the method of FIG. 15A.

DETAILED DESCRIPTION OF PREFERRED EMBODIMENTS

Figure 5:
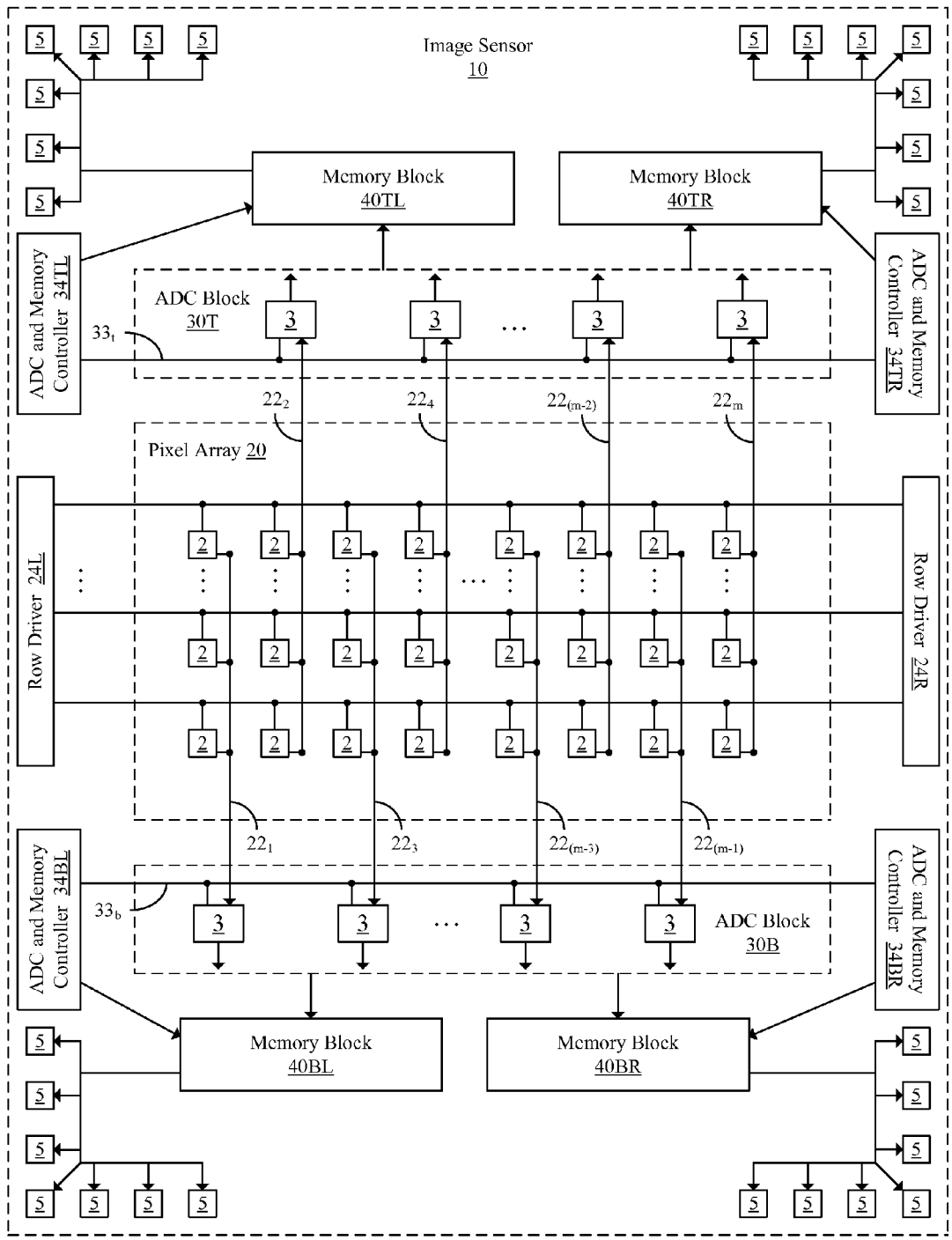
FIG. 5 illustrates a block diagram of an image sensor in accordance with an embodiment of the present invention.

FIG. 5 illustrates a block diagram of an image sensor 10 in accordance with an embodiment of the present invention. The image sensor 10 includes a pixel array 20, a left row driver 24L, a right row driver 24R, a top analog-to-digital conversion (ADC) block 30T, a bottom ADC block 30B, a top/left memory block 40TL, a top/right memory block 40TR, a bottom/left memory block 40BL, a bottom/right memory block 40BR, a top/left ADC and memory controller 34TL, a top/right ADC and memory controller 34TR, a bottom/left ADC and memory controller 34BL, a bottom/right ADC and memory controller 34BR, and pads 5. In various embodiments, the image sensor 10 may be, for example, a high speed complimentary metal oxide semiconductor (CMOS) image sensor, or the like.

Figure 2:
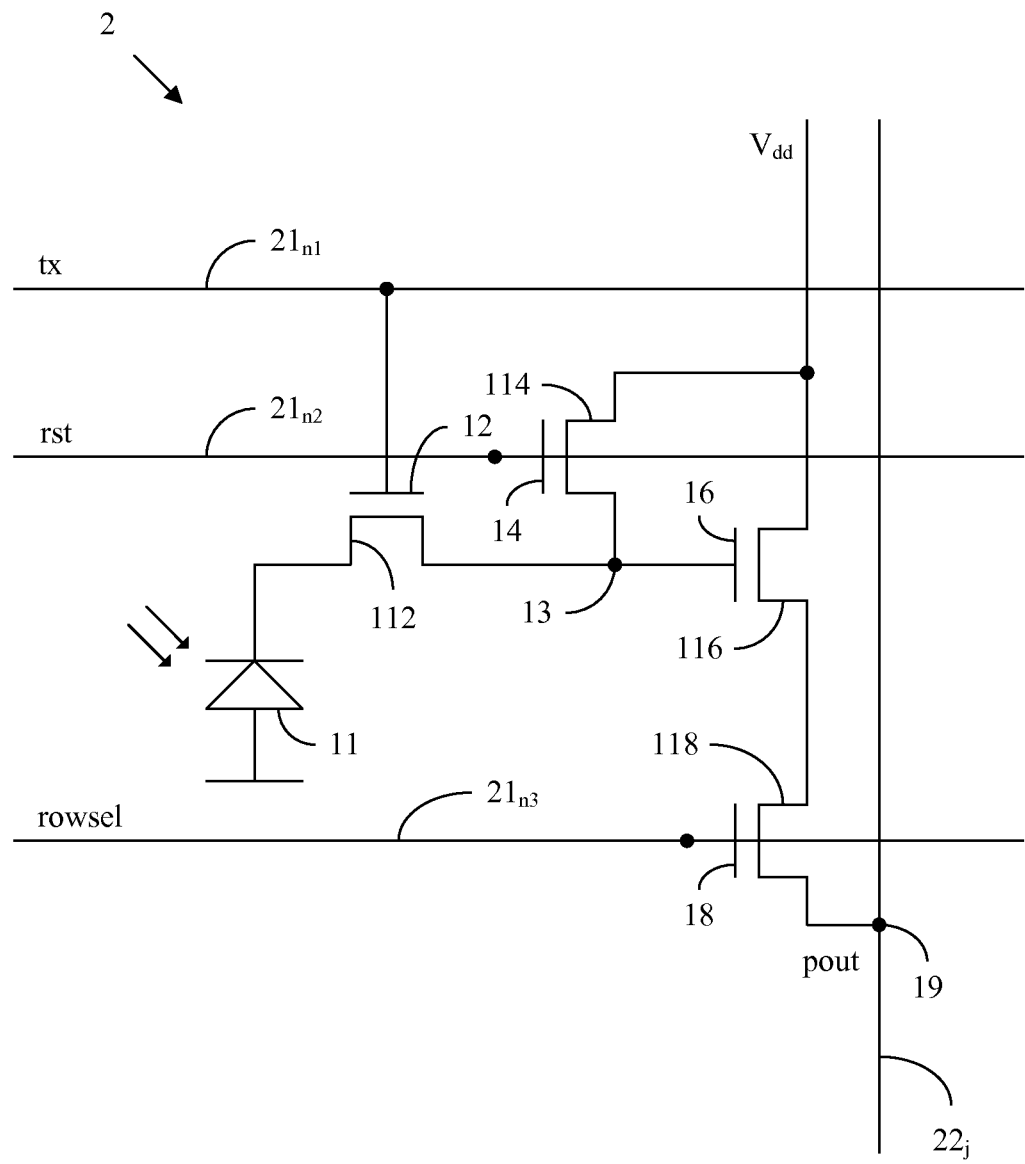
FIG. 2 illustrates an example of a design of a pixel.

The pixel array 20 includes a plurality of pixels 2. An example embodiment of the pixel 2 is illustrated in FIG. 2 as a four transistor (4T) pixel. In various embodiments, the pixel 2 may be another type of pixel, such as a three transistor (3T) pixel, a five transistor (5T) pixel, or the like. With reference to FIG. 5, the plurality of pixels 2 are arranged in a plurality of rows and a plurality of columns. For example, the pixels 2 in the pixel array 20 may be arranged in h rows and m columns, where h and m are integer values. Each pixel 2 of the pixel array 20 is configured to sample light intensity and to provide a corresponding analog pixel signal based on the sampled light intensity. The pixel array 20 further includes a plurality of column readout lines $22_1$, $22_2$, $22_3$, $22_4$, ..., $22_{(m-3)}$, $22_{(m-2)}$, $22_{(m-1)}$, $22_m$ for reading out signals from the pixels 2 in the corresponding columns. In the embodiment illustrated in FIG. 5, there is one column readout line per each column of pixels 2 in the pixel array 20. In various other embodiments, there may be two or more column readout lines per each column of pixels 2 in the pixel array 20.

Figure 6:
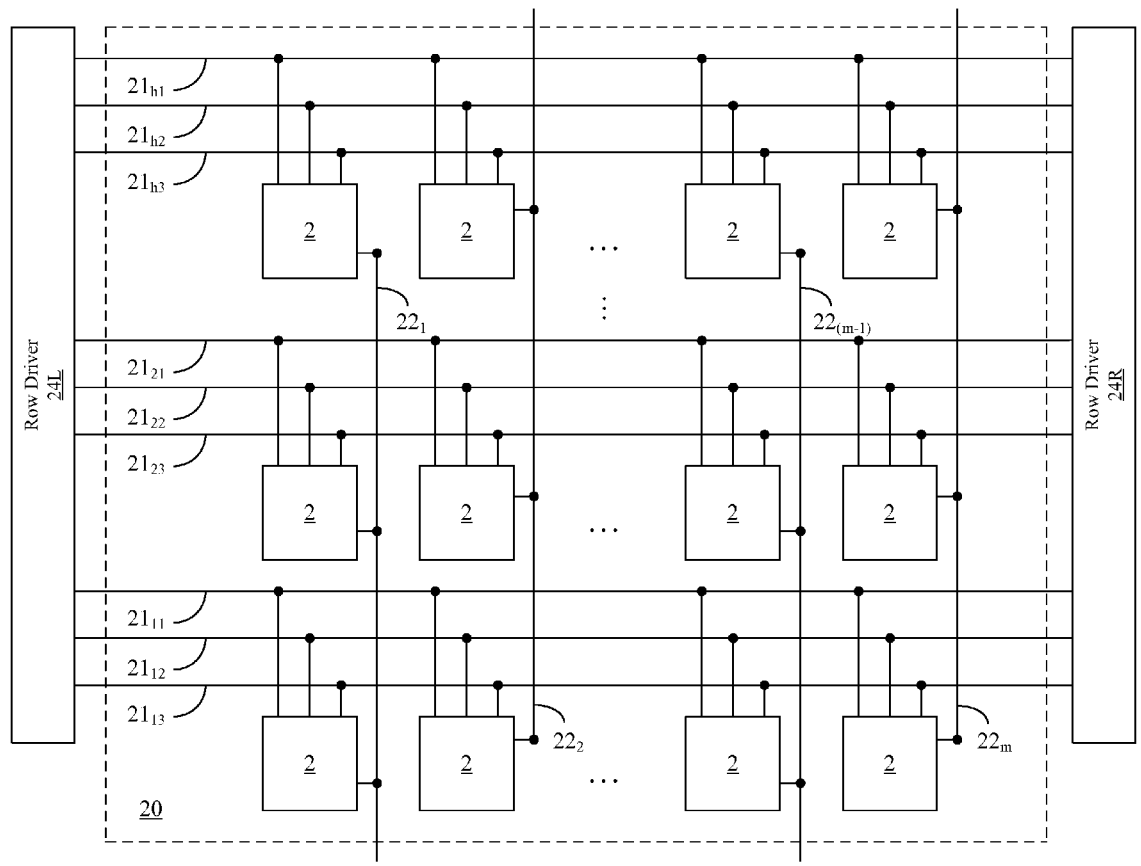
FIG. 6 illustrates a portion of an image sensor in accordance with an embodiment of the present invention.

The left row driver 24L and the right row driver 24R are configured to supply control signals to the plurality of pixels 2 in the pixel array 20. FIG. 6 illustrates a portion of the image sensor 10 (refer to FIG. 5) that includes the pixel array 20, the left row driver 24L, and the right row driver 24R. With reference to FIGS. 5 and 6, in various embodiments the left row driver 24L is connected to the pixels 2 in each row of the plurality of rows of the pixel array 20 by a corresponding one or more control lines for the row. Also, in various embodiments, the right row driver 24R is connected to the pixels 2 in each row of the plurality of rows of the pixel array 20 by the same corresponding one or more control lines for the row to which the left row driver 24L is connected.

For example, pixels 2 in a first row of the pixel array 20 are connected to the control lines $21_{11}$, $21_{12}$, and $21_{13}$, which are connected to both the left row driver 24L and the right row driver 24R. In various embodiments, the left row driver 24L and the right row driver 24R are configured to drive control signals over the control lines $21_{11}$, $21_{12}$, and $21_{13}$, such as driving a transfer signal over the control line $21_{11}$, a reset signal over the control line $21_{12}$, and a row select signal over the control line $21_{13}$. In various embodiments, pixels 2 in a second row of the pixel array 20 are connected to the control lines $21_{21}$, $21_{22}$, and $21_{23}$, which are connected to both the left row driver 24L and the right row driver 24R. Similarly, in various embodiments, pixels 2 in an $h^{th}$ row of the pixel array 20 are connected to the control lines $21_{h1}$, $21_{h2}$, and $21_{h3}$, which are connected to both the left row driver 24L and the right row driver 24R.

In various embodiments, the right row driver 24R is located on an opposite side of the pixel array 20 from the left row driver 24L. Also, in various embodiments, the right row driver 24R is controllable to provide a same one or more control signals on the one or more control lines for a row of pixels 2 as are provided by the left row driver 24L on the same one or more control lines. In various embodiments, the driving of control signals on one or more control lines by the right row driver 24R occurs concurrently with the driving of the same control signals on the same one or more control lines by the left row driver 24L. In some embodiments, the right row driver 24R drives one or more control signals over one or more control lines from an opposite direction as a direction in which the left row driver 24L drives the same one or more control signals over the same one or more control lines.

With reference again to FIG. 5, the top ADC block 30T includes a plurality of column readout circuits 3 that are connected to receive analog pixel signals provided from corresponding pixels 2 of the pixel array 20. The bottom ADC block 30B similarly includes a plurality of column readout circuits 3 that are connected to receive analog pixel signals provided from corresponding pixels 2 of the pixel array 20. In various embodiments, the top ADC block 30T receives analog pixel signals from pixels 2 that are in even numbered columns in the pixel array 20, while the bottom ADC block 30B receives analog pixel signals from pixels 2 that are in odd numbered columns in the pixel array 20. In various other embodiments, the top ADC block 30T receives analog pixel signals from pixels 2 that are in odd numbered columns in the pixel array 20, while the bottom ADC block 30B receives analog pixel signals from pixels 2 that are in even numbered columns in the pixel array 20.

Each column readout circuit 3 in the top ADC block 30T and the bottom ADC block 30B is connected to receive analog pixel signals provided from corresponding pixels 2 of the pixel array 20, and is configured to convert the received analog pixel signals into digital pixel signals. In various embodiments, such as the embodiment illustrated in FIG. 5, each column readout line $22_1$, $22_2$, $22_3$, ..., $22_{(m-1)}$, $22_m$, is connected to a single corresponding column readout circuit 3. In various other embodiments, each column readout line may be connected to a corresponding two or more column readout circuits 3. In various embodiments, there may be one column readout circuit 3 for each column of pixels 2 in the pixel array 20, while in various other embodiments, there may be two or more column readout circuits 3 for each column of pixels 2 in the pixel array 20. In some embodiments, each of the column readout circuits 3 in the top ADC block 30T may perform processing in parallel with the other column readout circuits 3 in the top ADC block 30T. Also, in some embodiments, each of the column readout circuits 3 in the bottom ADC block 30B may perform processing in parallel with the other column readout circuits 3 in the bottom ADC block 30B. In some embodiments, each of the column readout circuits 3 in the top ADC block 30T may perform processing in parallel with each of the column readout circuits 3 in the bottom ADC block 30B.

As illustrated in FIG. 5, in various embodiments the top ADC block 30T is located to one side of the pixel array 20 such that the column readout circuits 3 of the top ADC block 30T are located to one side of the pixel array 20. Also, in various embodiments, the column readout circuits 3 of the top ADC block 30T all receive analog pixel signals that are output from a same side of the pixel array 20, and that are output in a same direction from the pixel array 20. In some embodiments, the top ADC block 30T spans a length of a row of pixels 2 in the pixel array 20. Similarly, in various embodiments the bottom ADC block 30B is located to one side of the pixel array 20 such that the column readout circuits 3 of the bottom ADC block 30B are located to one side of the pixel array 20. Also, in various embodiments, the column readout circuits 3 of the bottom ADC block 30B all receive analog pixel signals that are output from a same side of the pixel array 20, and that are output in a same direction from the pixel array

20. In some embodiments, the bottom ADC block 30B spans a length of a row of pixels 2 in the pixel array 20.

The top/left memory block 40TL is connected to receive digital pixel signals provided by corresponding column readout circuits of the plurality of column readout circuits 3 of the top ADC block 30T. The top/left memory block 40TL is controllable to store the received digital pixel signals as digital pixel values, and to output the digital pixel values as digital signals to corresponding pads 5. The top/right memory block 40TR is connected to receive digital pixel signals provided by corresponding column readout circuits of the plurality of column readout circuits 3 of the top ADC block 30T. The top/right memory block 40TR is controllable to store the received digital pixel signals as digital pixel values, and to output the digital pixel values as digital signals to corresponding pads 5. In various embodiments, the outputs from column readout circuits 3 of the top ADC block 30T that are provided to a same memory block may be multiplexed onto one or more buses to be provided to the memory block.

The bottom/left memory block 40BL is connected to receive digital pixel signals provided by corresponding column readout circuits of the plurality of column readout circuits 3 of the bottom ADC block 30B. The bottom/left memory block 40BL is controllable to store the received digital pixel signals as digital pixel values, and to output the digital pixel values as digital signals to corresponding pads 5. The bottom/right memory block 40BR is connected to receive digital pixel signals provided by corresponding column readout circuits of the plurality of column readout circuits 3 of the bottom ADC block 30B. The bottom/right memory block 40BR is controllable to store the received digital pixel signals as digital pixel values, and to output the digital pixel values as digital signals to corresponding pads 5. In various embodiments, the outputs from column readout circuits 3 of the bottom ADC block 30B that are provided to a same memory block may be multiplexed onto one or more buses to be provided to the memory block.

A center of the pixel array 20 may be defined as a middle of a length of a row of pixels 2 in the pixel array 20 and as a middle of a height of a column of pixels 2 in the pixel array 20. In various embodiments, the image sensor 10 may then be described with respect to the center of the pixel array 20 as having a top/left portion, a top/right portion, a bottom/left portion, and a bottom/right portion. In various embodiments, the top/left memory block 40TL is located in the top/left portion of the image sensor 10 and outputs digital signals to corresponding pads 5 located in the top/left portion of the image sensor 10. In various embodiments, the top/right memory block 40TR is located in the top/right portion of the image sensor 10 and outputs digital signals to corresponding pads 5 located in the top/right portion of the image sensor 10. In various embodiments, the bottom/left memory block 40BL is located in the bottom/left portion of the image sensor 10 and outputs digital signals to corresponding pads 5 located in the bottom/left portion of the image sensor 10. In various embodiments, the bottom/right memory block 40BR is located in the bottom/right portion of the image sensor 10 and outputs digital signals to corresponding pads 5 located in the bottom/right portion of the image sensor 10.

In various embodiments, the pads 5 are input/output (I/O) pads, I/O ports, or the like, for outputting data from the image sensor 10. In some embodiments the pads 5 further allow for inputting data into the image sensor 10. While the image sensor 10 has been illustrated in FIG. 5 with two memory blocks 40TL, 40TR connected to the top ADC block 30T and two memory blocks 40BL, 40BR connected to the bottom ADC block 30B, it should be appreciated that, in various other embodiments, more than two memory blocks may be connected to each of the top ADC block 30T and the bottom ADC block 30B, respectively. Also, in various embodiments, less than two memory blocks may be connected to each of the top ADC block 30T and the bottom ADC block 30B, respectively.

In various embodiments, the top/left ADC and memory controller 34TL includes circuitry configured to supply control signals over control lines $33_t$ to control operations of corresponding column readout circuits 3 of the top ADC block 30T, and configured to supply control signals to control an operation of the top/left memory block 40TL. In various embodiments, the top/right ADC and memory controller 34TR includes circuitry configured to supply control signals over the control lines $33_t$ to control operations of corresponding column readout circuits 3 of the top ADC block 30T, and configured to supply control signals to control an operation of the top/right memory block 40TR. In various embodiments, the bottom/left ADC and memory controller 34BL includes circuitry configured to supply control signals over control lines $33_b$ to control operations of corresponding column readout circuits 3 of the bottom ADC block 30B, and configured to supply control signals to control an operation of the bottom/left memory block 40BL. In various embodiments, the bottom/right ADC and memory controller 34BR includes circuitry configured to supply control signals over control lines $33_b$ to control operations of corresponding column readout circuits 3 of the bottom ADC block 30B, and configured to supply control signals to control an operation of the bottom/right memory block 40BR.

In some embodiments, the column readout circuits 3 of the top ADC block 30T are located between the top/left ADC and memory controller 34TL and the top/right ADC and memory controller 34TR. Also, in some embodiments, the column readout circuits 3 of the bottom ADC block 30B are located between the bottom/left ADC and memory controller 34BL and the bottom/right ADC and memory controller 34BR. While each ADC and memory controller 34TL, 34TR, 34BL, and 34BR is illustrated as a single unit, it should be appreciated that, in various embodiments, each ADC and memory controller may include an ADC controller for controlling column readout circuits, and a separate memory controller for controlling a memory block.

Figure 7:
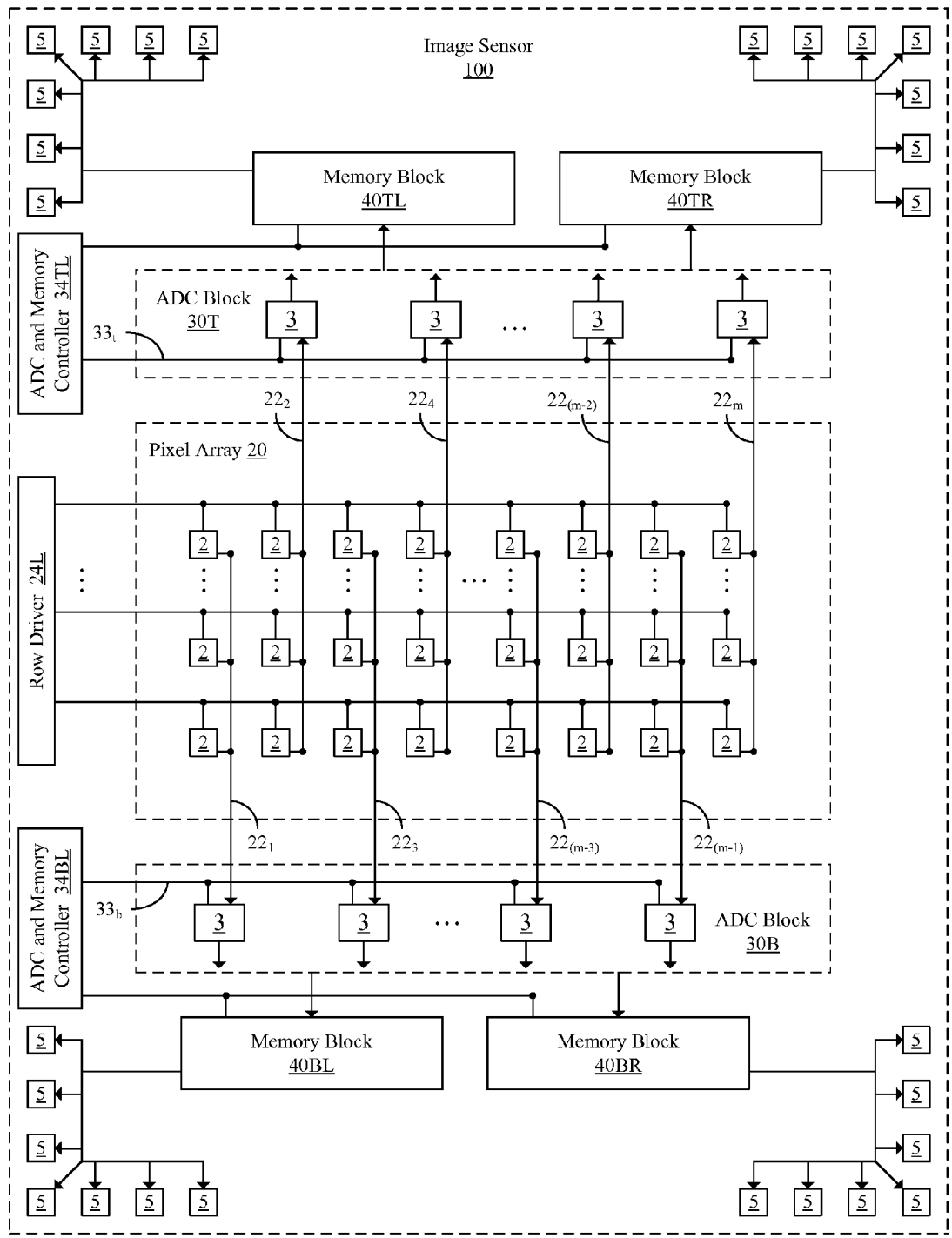
FIG. 7 illustrates a block diagram of an image sensor in accordance with an embodiment of the present invention.

FIG. 7 illustrates a block diagram of an image sensor 100 in accordance with an embodiment of the present invention. With reference to FIGS. 5 and 7, the image sensor 100 is similar to the image sensor 10, but the image sensor 100 does not include the top/right ADC and memory controller 34TR, the right row driver 24R, and the bottom/right ADC and memory controller 34BR. In the image sensor 100, the top/left ADC and memory controller 34TL provides control signals to the column readout circuits 3 of the top ADC block 30T over the control lines $33_t$, and provides control signals to the top/left memory block 40TL and the top/right memory block 40TR. Also, in the image sensor 100, the bottom/left ADC and memory controller 34BL provides control signals to the column readout circuits 3 of the bottom ADC block 30B over the control lines $33_b$, and provides control signals to the bottom/left memory block 40BL and the bottom/right memory block 40BR. In the image sensor 100, the left row driver 24L provides control signals to the plurality of pixels 2 in the pixel array 20. In various other embodiments, all columns in the pixel array 20 may output signals to a same side of the pixel array 20.

Figure 8:
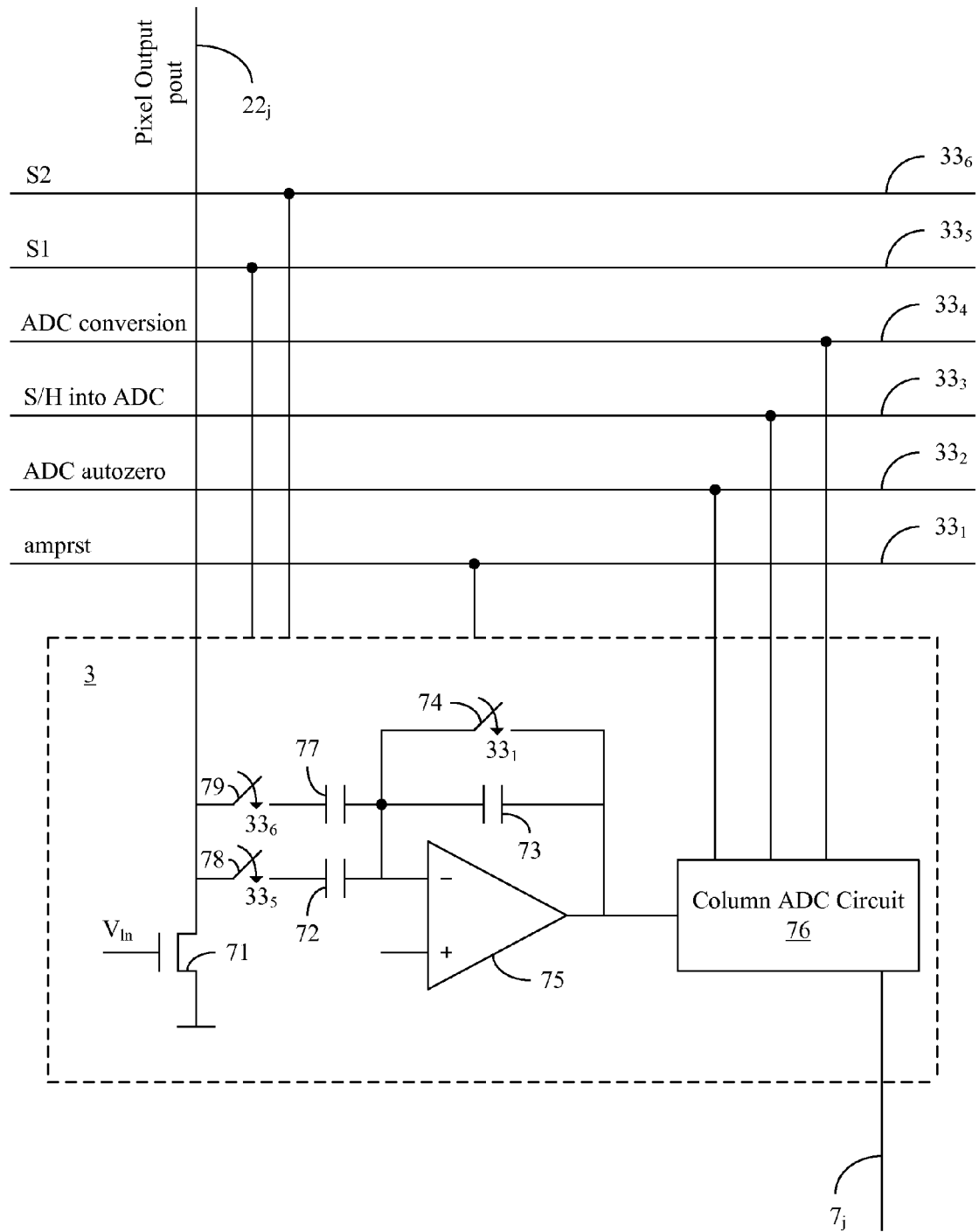
FIG. 8 illustrates a portion of an image sensor in accordance with an embodiment of the present invention.

FIG. 8 illustrates a portion of an image sensor, such as the image sensor 10 (refer to FIG. 5), the image sensor 100 (refer to FIG. 7), or the like, with circuitry for performing readout from a $j^{th}$ column of a pixel array, such as the pixel array 20 (refer to FIG. 6). As illustrated in FIG. 8, the column readout circuit 3 for the $j^{th}$ column is connected to receive pixel output (pout) signals over the column readout line $22_j$, and is connected to receive control signals from a controller (not shown in FIG. 8), such as the top/left ADC and memory controller 34TL (refer to FIG. 5), the top/right ADC and memory controller 34TR (refer to FIG. 5), the bottom/left ADC and memory controller 34BL (refer to FIG. 5), the bottom/right ADC and memory controller 34BR (refer to FIG. 5), or the like. In various embodiments, the control signals include: (1) an amplifier reset (amprst) signal provided over a control line $33_1$; (2) an ADC autozero signal (ADC autozero) provided over a control line $33_2$; (3) an amplification and sample and hold signal (S/H into ADC) provided over a control line $33_3$; (4) an ADC conversion signal (ADC conversion) provided over a control line $33_4$; (5) a first switch signal (S1) provided over a control line $33_5$; and (6) a second switch signal (S2) provided over a control line $33_6$. The column readout circuit 3 provides output over an output line $7_j$.

The column readout circuit 3 includes a current sink transistor 71, a first capacitor 72, a second capacitor 77, a first switch 78, a second switch 79, a feedback capacitor 73, an amplifier reset switch 74, an amplifier 75, and a column ADC circuit 76. A first terminal of the current sink transistor 71 is connected to the column readout line $22_j$, and a second terminal of the current sink transistor 71 is connected to a fixed voltage, such as ground or another suitable voltage. A gate of the current sink transistor 71 is connected to a voltage $V_{1n}$.

A first terminal of the first switch 78 is connected to the column readout line $22_j$, and a second terminal of the first switch 78 is connected to a first terminal of the first capacitor 72. A second terminal of the first capacitor 72 is connected to a negative input of the amplifier 75. The first switch 78 is controlled by the first switch signal S1 provided over the control line $33_5$. A first terminal of the second switch 79 is connected to the column readout line $22_j$, and a second terminal of the second switch 79 is connected to a first terminal of the second capacitor 77. A second terminal of the second capacitor 77 is connected to the negative input of the amplifier 75. The second switch 79 is controlled by the second switch signal S2 provided over the control line $33_6$. In some embodiments, the first switch 78 and the second switch 79 each comprise a transistor, or the like. The first capacitor 72 is provided as an example of column storage and, in various other embodiments, one or more other storage elements capable of storing a signal value may be used as column storage. The second capacitor 77 is provided as an example of additional column storage and, in various other embodiments, one or more other storage elements capable of storing a signal value may be used as the additional column storage.

A first terminal of the feedback capacitor 73 is connected to the negative input of the amplifier 75, and a second terminal of the feedback capacitor 73 is connected to an output of the amplifier 75. A first terminal of the amplifier reset switch 74 is connected to the negative input of the amplifier 75, and a second terminal of the amplifier reset switch 74 is connected to an output of the amplifier 75. The amplifier reset switch 74 is controlled by the amplifier reset (amprst) signal provided on the control line $33_1$. In some embodiments, the amplifier reset switch 74 comprises a transistor, or the like.

The output of the amplifier 75 is connected to the column ADC circuit 76. The column ADC circuit 76 is also connected to the control lines $33_2$, $33_3$, and $33_4$, for receiving the ADC autozero signal, the S/H into ADC signal, and the ADC conversion signal, respectively. The column ADC circuit 76 is configured to perform an autozero operation in accordance with the ADC autozero signal. The column ADC circuit 76 is configured to sample and hold an output from the amplifier 75 in accordance with the S/H into ADC signal. The column ADC circuit 76 is configured to perform analog-to-digital conversion of an analog signal in accordance with the ADC conversion signal, and to provide the digital result as output on the output line $7_j$.

Figure 9:
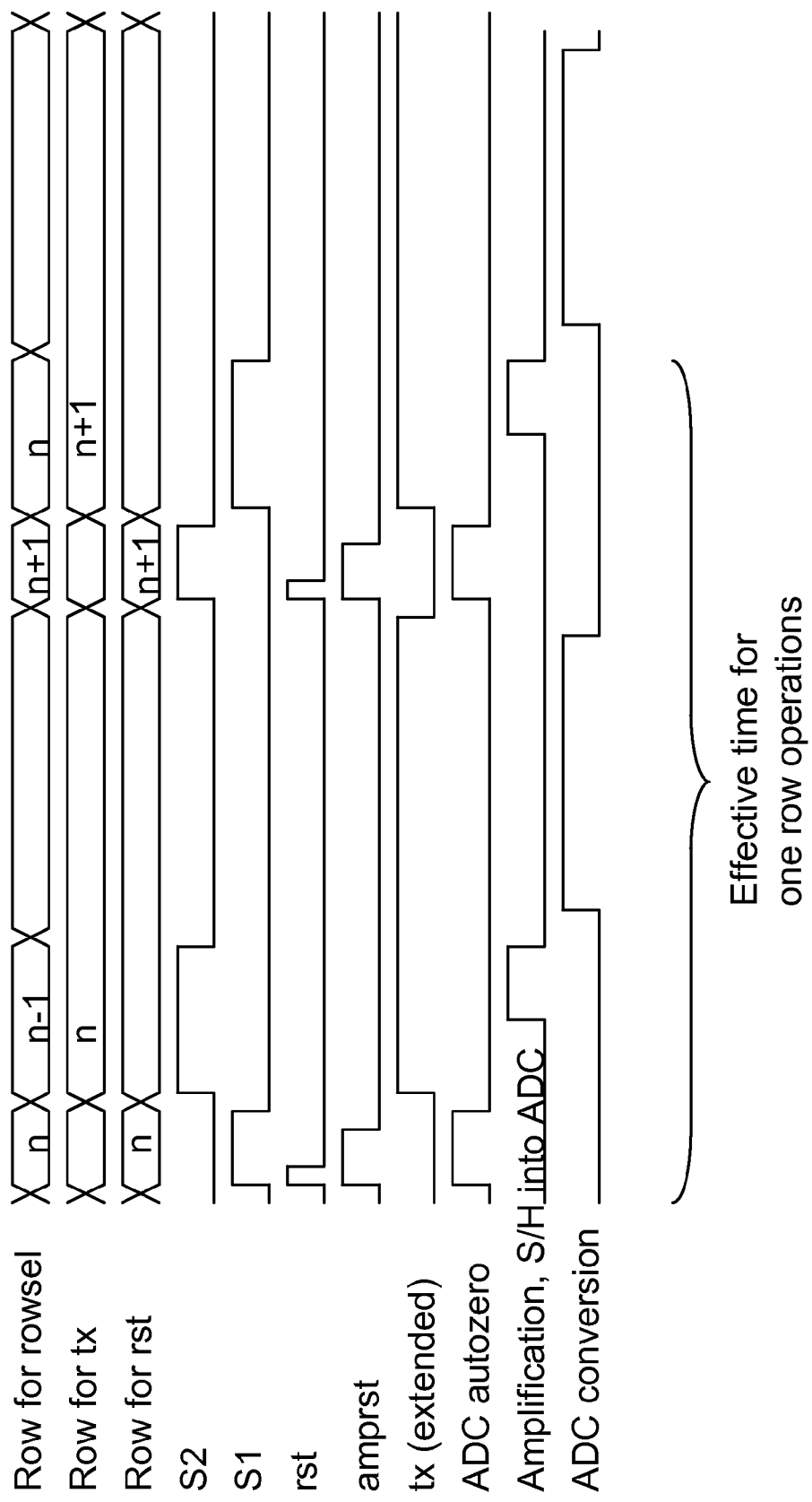
FIG. 9 illustrates a signal timing chart for a pixel readout scheme in accordance with an embodiment of the present invention.
Figure 10:
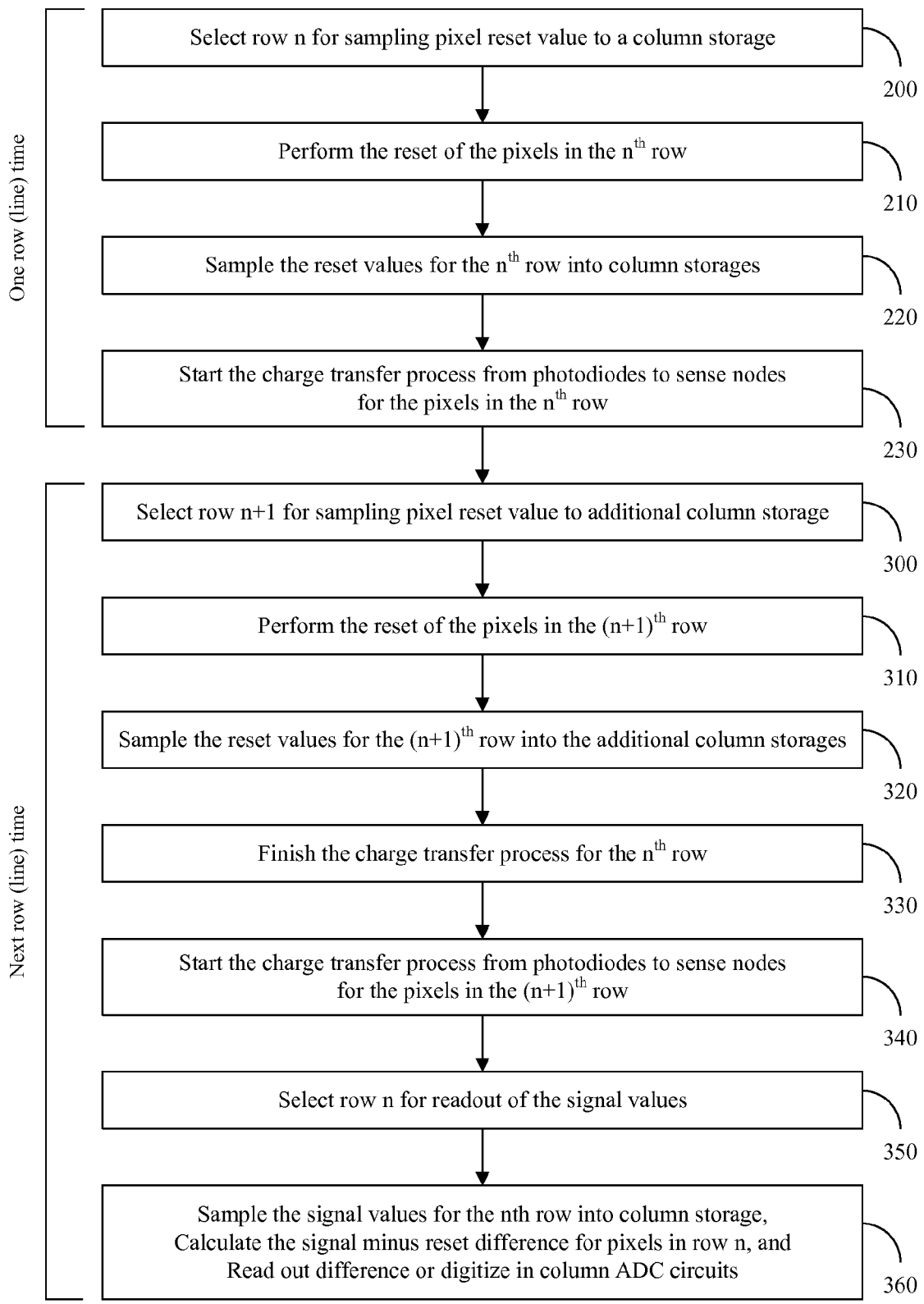
FIG. 10 illustrates a flowchart of a method in accordance with an embodiment of the present invention.

FIG. 9 illustrates a signal timing chart for a pixel readout scheme in accordance with an embodiment of the present invention. FIG. 10 illustrates a flowchart of a method in accordance with an embodiment of the present invention. An embodiment of the method of FIG. 10 is now discussed with reference to FIG. 9 for signal timing and with reference to FIGS. 2 and 5-8 for image sensor circuit structure.

In step 200, a row n of the pixel array 20 is selected for sampling a pixel reset value from each pixel 2 in the row to a corresponding column storage, such as the first capacitor 72, of the corresponding column readout circuit 3. The method then continues to step 210. In step 210, reset of the pixels 2 is performed for pixels 2 in the $n^{th}$ row of the pixel array 20. To perform the reset, one or more row drivers, such as the left row driver 24L or the right row driver 24R, provides a HIGH signal for rst on the reset signal line $21_{n2}$ to reset the sense node 13 of each pixel 2 in the row n. The method then continues to step 220. In step 220, the reset value for each pixel 2 in row n of the pixel array 20 is sampled into the corresponding column storage, such as the first capacitor 72, of the corresponding column readout circuit 3. To perform the sampling of the reset values, one or more controllers, such as one or more of the ADC and memory controllers 34TL, 34TR, 34BL, 34BR, or the like, provide a HIGH signal for 51 on the control line $33_5$ to close the first switch 78 of the column readout circuit 3 between the corresponding column readout line and the first capacitor 72 of the column readout circuit 3; and the one or more row drivers provide a HIGH signal on the row select signal line $21_{n3}$ to cause the reset value for each pixel 2 in the row n to be read out and sampled in the corresponding first capacitor 72 of the corresponding column readout circuit 3. After the sampling of the reset values for the row n, the one or more controllers provide a LOW signal for 51 on the control line $33_5$ to open the first switch 78 of each of the column readout circuits 3. The method then continues to step 230.

In step 230, a charge transfer process is started to transfer charge from the photodiode 11 to the sense node 13 in each pixel 2 in row n of the pixel array 20. To start the charge transfer process, the one or more row drivers provide a HIGH signal for tx on the transfer signal line $21_{n1}$ to allow charge to pass from the photodiode 11 to the sense node 13 through the transfer transistor 112 in each pixel 2 in the row n of the pixel array 20.

During the charge transfer process of the pixels 2 in the row n, signal values from pixels 2 in a previous row (n−1) are read out from the pixel array 20 and are directed to the corresponding additional column storage, such as the second capacitor 77, of the corresponding column readout circuit 3 by providing a HIGH signal for S2 on the control line $33_6$ to close the second switch 79 of each column readout circuit 3. Just before the signal values from the pixels in the row (n−1) are read out, each second capacitor 77 of each column readout circuit 3 is storing a corresponding reset value stored during a previous line time, so when the signal values from the pixels in the row (n−1) are read out, a difference between the signal value for each pixel 2 in the row (n−1) and the corresponding reset value is provided from the corresponding second capacitor 77 to be amplified by the corresponding amplifier 75 and converted from analog to digital form by the corresponding column ADC circuit 76. The method then continues to step 300.

In step 300, a following row n+1 of the pixel array 20 is selected for sampling a pixel reset value from each pixel 2 in the row to the corresponding additional column storage, such as the second capacitor 77, of the corresponding column readout circuit 3. The method then continues to step 310. In step 310, reset of the pixels 2 is performed for pixels 2 in row n+1 of the pixel array 20. To perform the reset, the one or more row drivers provides a HIGH signal for rst on the reset signal line $21_{(n+1)2}$ to reset the sense node 13 of each pixel 2 in the row n+1. The method then continues to step 320.

In step 320, the reset value for each pixel 2 in row n+1 of the pixel array 20 is sampled into the corresponding additional column storage, such as the second capacitor 77, of the corresponding column readout circuit 3. At that time, there is a LOW signal for S1 on the control line $33_5$, so the first switch 78 of each column readout circuit 3 is open. To perform the sampling of the reset values, the one or more controllers provide a HIGH signal for S2 on the control line $33_6$ to close the second switch 79 of the column readout circuit 3 between the corresponding column readout line and the second capacitor 77 of the column readout circuit 3; and the one or more row drivers provide a HIGH signal on the row select signal line $21_{(n+1)3}$ to cause the reset value for each pixel 2 in the row n+1 to be read out and sampled in the corresponding second capacitor 77 of the corresponding column readout circuit 3. After the sampling of the reset values for the row n+1, the one or more controllers provide a LOW signal for S2 on the control line $33_6$ to open the second switch 79 of each of the column readout circuits 3. The method then continues to step 330.

In step 330, the charge transfer process for transferring charge from the photodiode 11 to the sense node 13 is terminated in each pixel 2 in row n of the pixel array 20. To terminate the charge transfer process, the one or more row drivers provide a LOW signal for tx on the transfer signal line $21_{n1}$ to inhibit charge from passing from the photodiode 11 to the sense node 13 through the transfer transistor 112 in each pixel 2 in the row n of the pixel array 20. The method then continues to step 340. In step 340, a charge transfer process is started to transfer charge from the photodiode 11 to the sense node 13 in each pixel 2 in row n+1 of the pixel array 20. To start the charge transfer process, the one or more row drivers provide a HIGH signal for tx on the transfer signal line $21_{(n+1)1}$ to allow charge to pass from the photodiode 11 to the sense node 13 through the transfer transistor 112 in each pixel 2 in the row n+1 of the pixel array 20. The method then continues to step 350.

In step 350, a row n of the pixel array 20 is selected for readout of a signal value from each pixel 2 in the row to a corresponding column storage, such as the first capacitor 72, of the corresponding column readout circuit 3. The method then continues to step 360. In step 360, the signal value from each pixel 2 in row n of the pixel array 20 is provided to be sampled by the corresponding column storage, such as the first capacitor 72, of the corresponding column readout circuit 3. The one or more controllers provide a HIGH signal for S1 on the control line $33_5$ to close the first switch 78 of each column readout circuit 3. Just before the signal values from the pixels 2 in the row n are read out, each first capacitor 72 of each column readout circuit 3 is storing a corresponding reset value, so when the signal values from the pixels 2 in the row n are read out, a difference between the signal value for each pixel 2 in the row n and the corresponding reset value is provided from the corresponding first capacitor 72 to be amplified by the corresponding amplifier 75 and converted from analog to digital form by the corresponding column ADC circuit 76. In various embodiments, the column ADC circuits 76 of the column readout circuits 3 perform analog-to-digital conversion of the difference between the signal value and the reset value of the pixels 2 of row n at least partially during a same time as the charge transfer process occurs in the pixels 2 of row n+1. The pixel readout scheme then repeats for the remaining rows in the pixel array 20. In various embodiments, the steps 200-230 are performed during one row (line) time, and the steps 300-360 are performed during a following row (line) time.

Figure 4A:
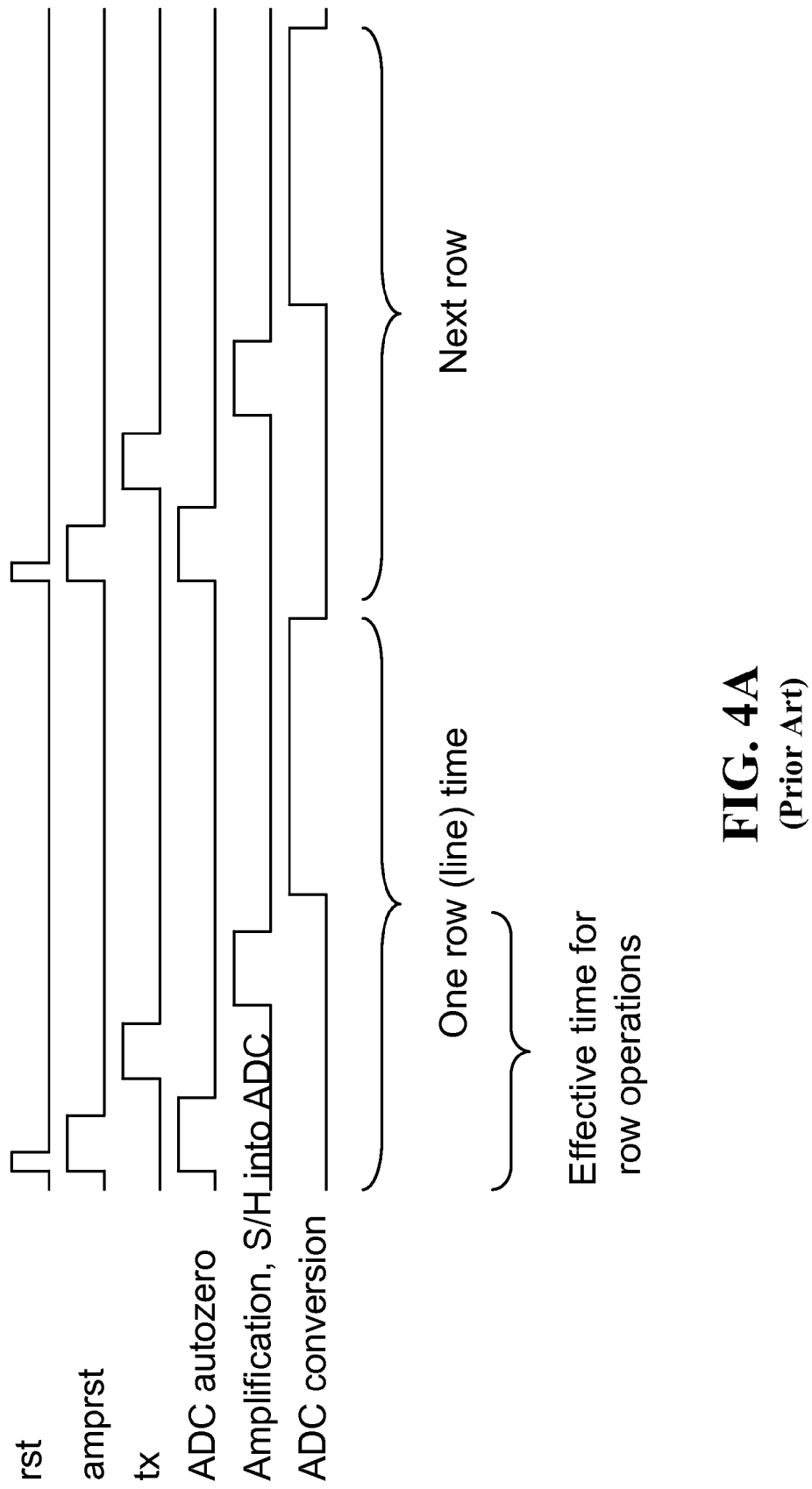
FIG. 4A illustrates a signal timing chart for a related art pixel readout scheme.

As is seen by a difference between the pixel readout scheme of FIG. 9 and the pixel readout scheme of FIG. 4A, the pixel readout scheme of FIG. 9 allows for extending a time for charge transfer in the pixels 2 as compared with the pixel readout scheme of FIG. 4A.

In general, pixel operations include three or four major steps: action1, reading of the first signal from the pixel, action2, and reading of the second signal from the pixel. In 3T and 5T pixels, the first action does not exist, and the second action is the pixel reset. In 4T pixels, action1 is the pixel reset, and action2 is the pixel charge transfer.

A readout technique in accordance with an embodiment of the present invention allows for two lines of pixels to be accessed for partial readout during one line time. The first row is accessed first, the action1 is performed, and a first pixel signal is sampled into a first capacitance with respect to a virtual ground of a column amplifier. The first row is disabled for readout, but is enabled for the action2 and is left in this state until the next line time. A previous row is enabled for reading of a result of the action2, a second capacitance holding a first pixel signal from the previous row is connected to the amplifier, and a difference between the second and the first signal from the previous row is amplified and sampled into an ADC circuit.

The next line time will start with accessing the next row and storing a first pixel signal of that next row onto the second column capacitor, then enabling the first row and enabling the first capacitor and amplifying the signal pair for the first row. The process then repeats for the remaining rows.

Another way of extending the pixel operation time over ADC time in accordance with an embodiment of the present invention would be in using four additional sample and hold storages in each column for the pixel reset and the pixel signal voltages. During one row operation, the pair of the pixel signals could be sampled into the first two sample-and-hold storages. During the next row time, another pair of the pixel signals could be stored into the second pair of sample-and-hold storages, while the first pair of the signals could be read into the column amplifier, amplified and digitized.

Figure 1:
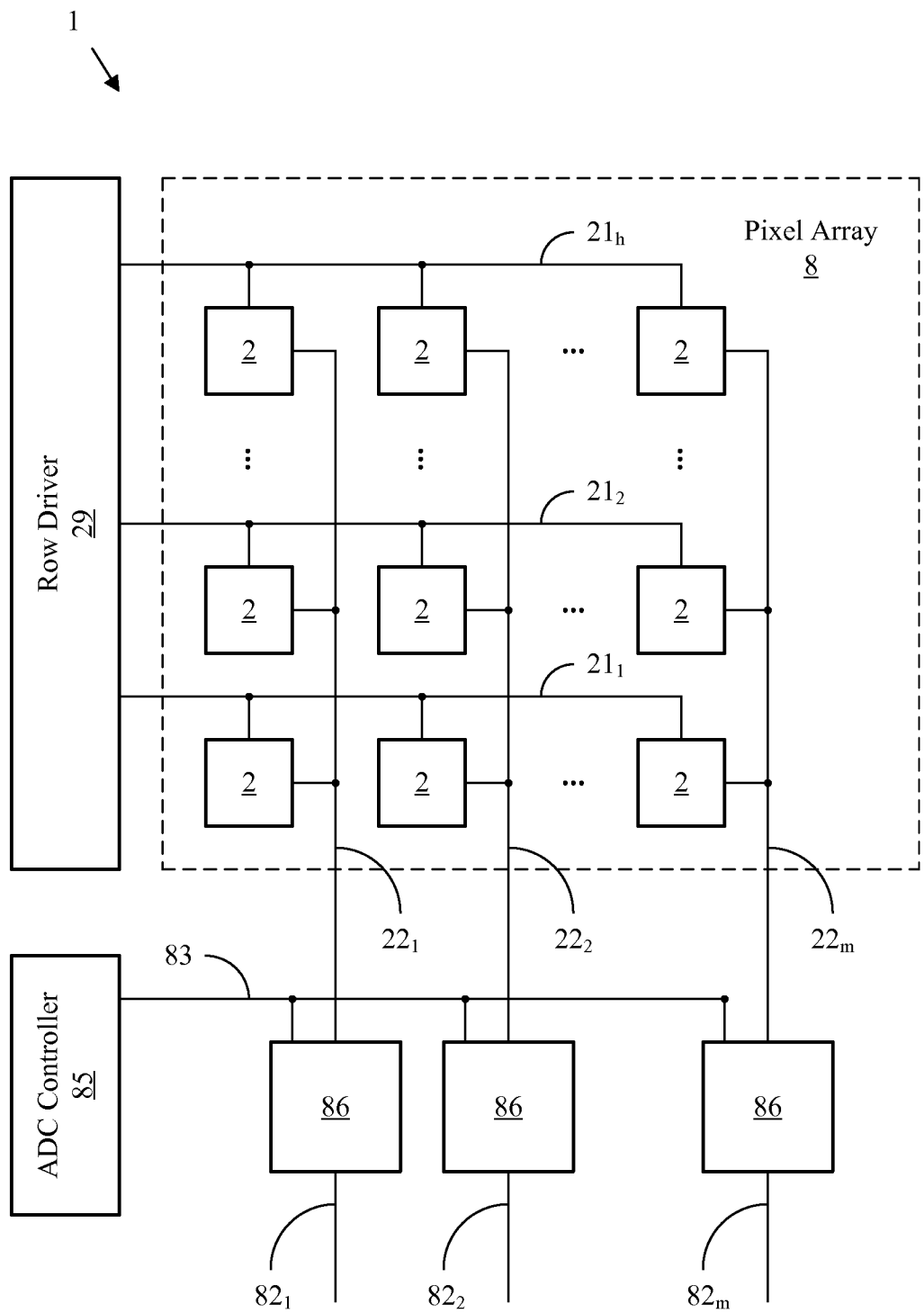
FIG. 1 illustrates an architecture of a related art image sensor.
Figure 11:
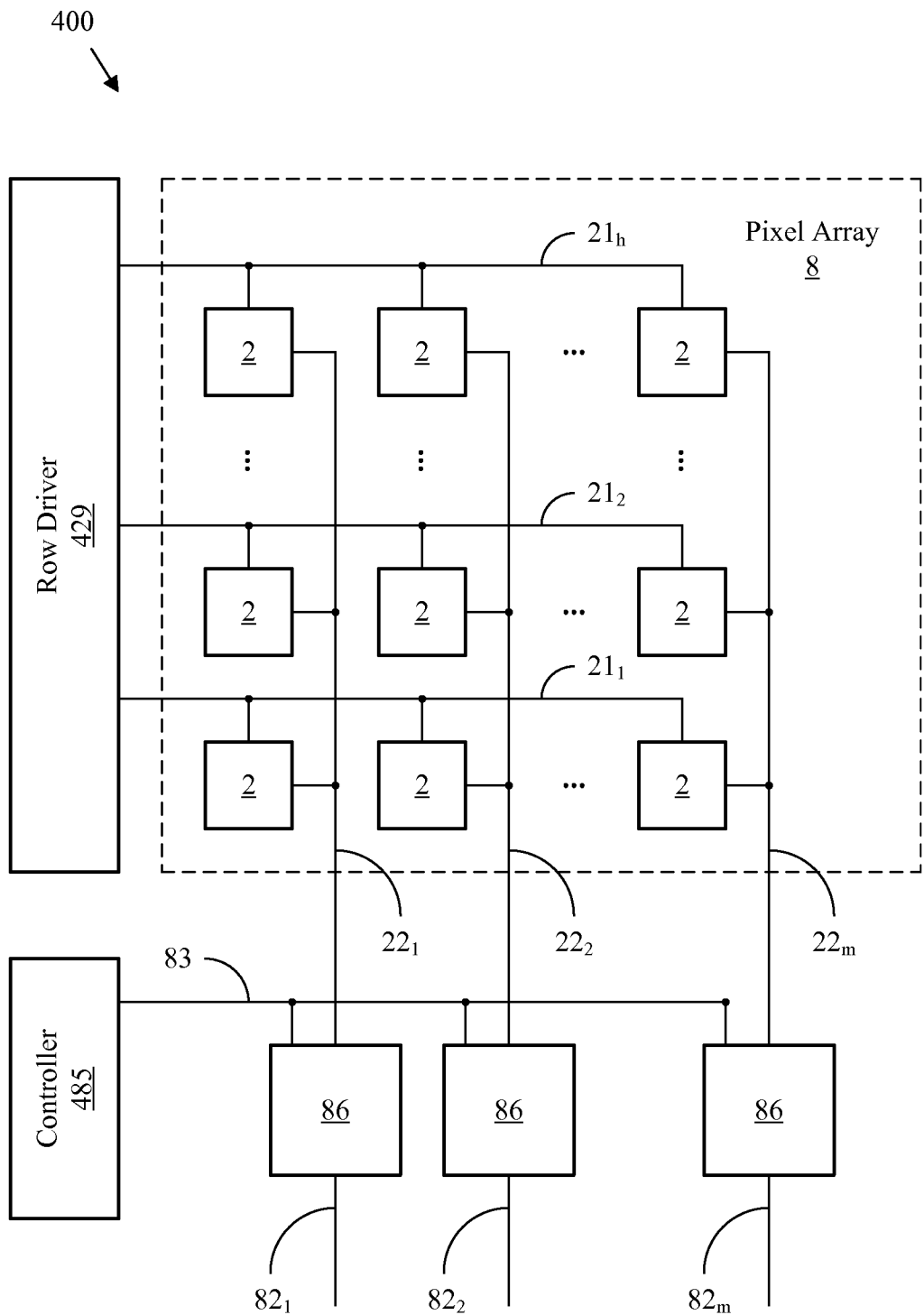
FIG. 11 illustrates a block diagram of an image sensor in accordance with an embodiment of the present invention.

FIG. 11 illustrates an image sensor 400 in accordance with an embodiment of the present invention. The image sensor 400 of FIG. 11 is similar to the image sensor 1 of FIG. 1 except the image sensor 400 includes the row driver 429 and the controller 485 instead of the row driver 29 and the ADC controller 85. The row driver 429 and the controller 485 are used to perform a different readout scheme than is performed by the row driver 29 and the ADC controller 85. The other elements that are similar between the image sensor 400 and the image sensor 1 are labeled with the same numerals in those figures. The row driver 429 controls the pixels 2 in the pixel array 8. The controller 485 controls the column readout circuits 86. The layout of each column readout circuit 86 can be the layout shown in FIG. 3.

Figure 3:
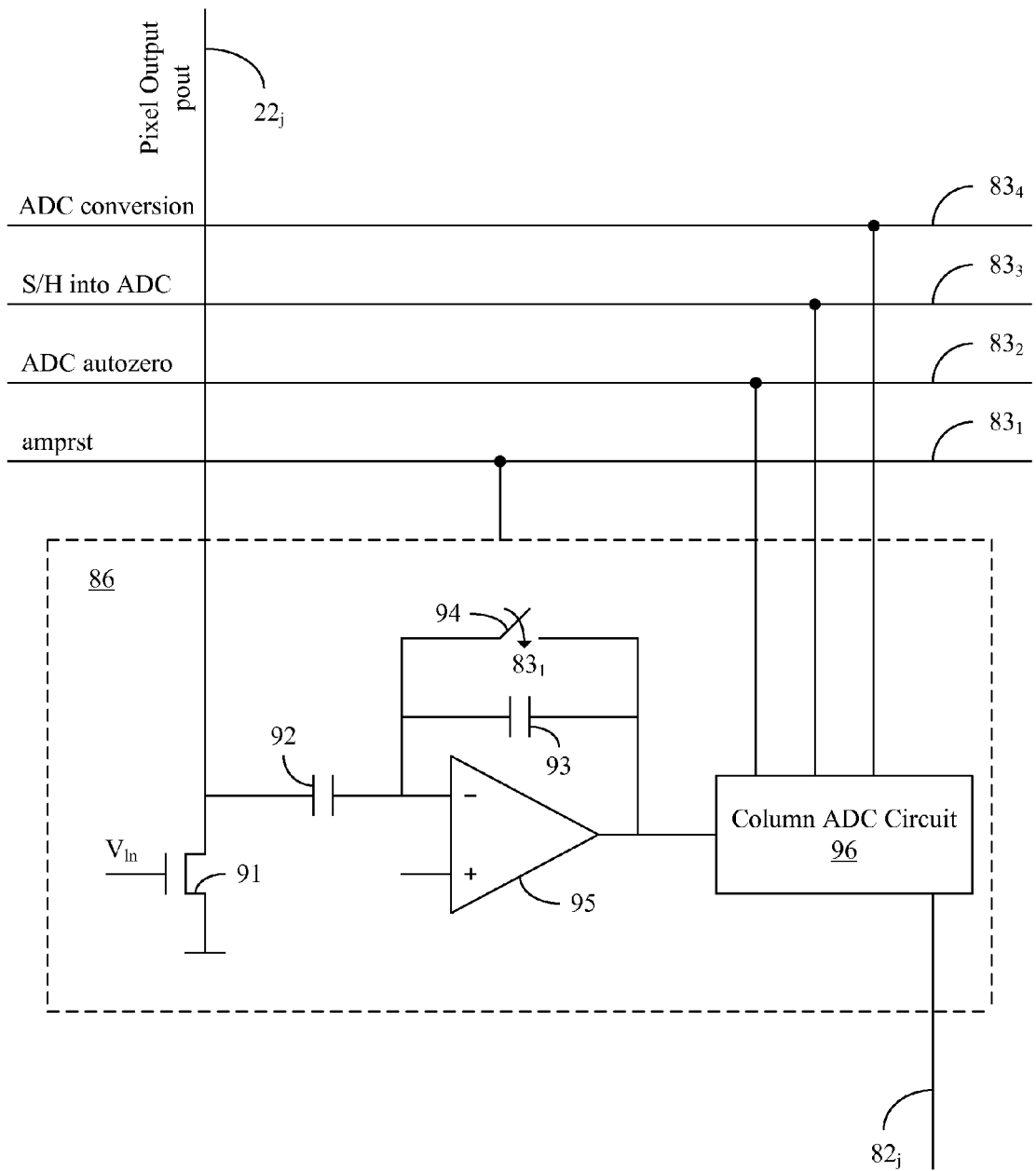
FIG. 3 illustrates a portion of a related art image sensor.
Figure 12:
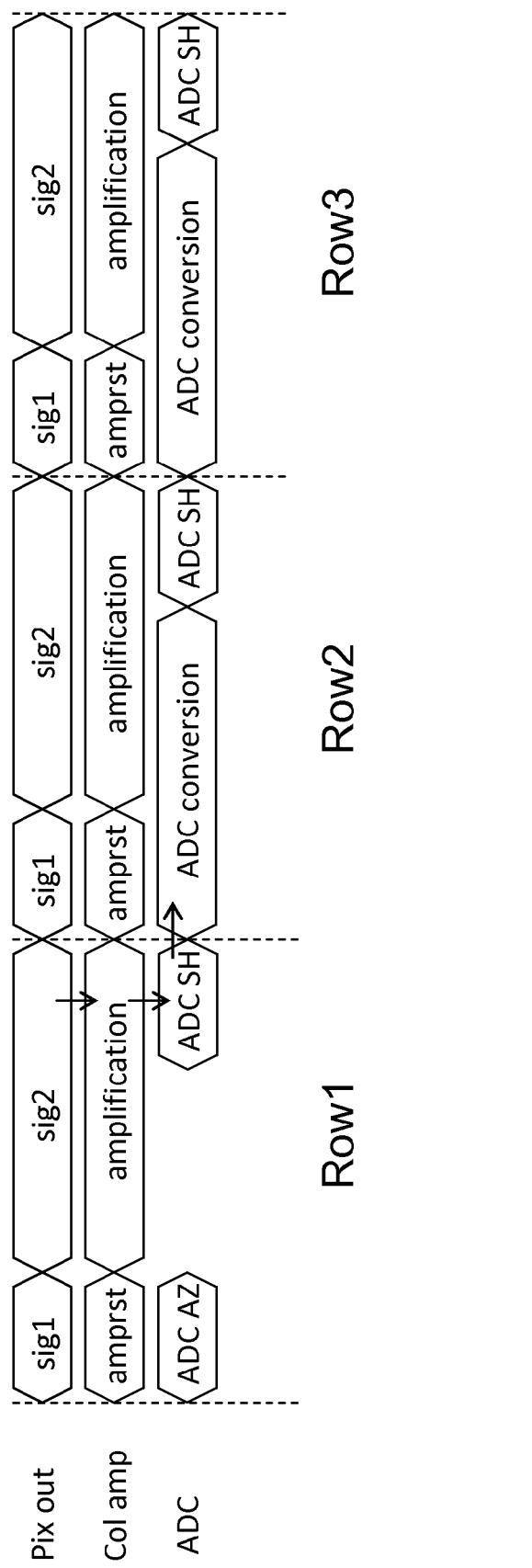
FIG. 12 illustrates a pipelined readout scheme for an image sensor in accordance with an embodiment of the present invention.

FIG. 12 shows a pipelined readout scheme performed by the image sensor 400 of FIG. 11 through controls provided by the row driver 429 and the controller 485. In various complimentary metal oxide semiconductor (CMOS) image sensor readout schemes, a photo-signal from a pixel, such as each of the pixels 2, is represented with two voltage signals that are read out with one following another from the pixel. For simplicity, the two pixel signals output from the pixel can be called "sig1" and "sig2." One of the pixel signals (either sig1 or sig2) from a pixel represents a value of an empty sense node or readout node in the pixel after the pixel has been reset, and the other of the pixel signals (the other of sig1 or sig2) represents a value of the same sense node as filled with photo-charge from an exposure. The order of whether the reset signal is read out first (as sig1) or second (as sig2) depends on the details of the pixel implementation. With reference to FIGS. 12, 11, and 3, a sequence of operations of a pipelined readout scheme for one frame in accordance with an embodiment of the present invention is as follows:

(a) The frame starts with a vertical blank period. For example, global pixel operations are performed for the pixels 2 in the pixel array 8 under the control of the row driver 429, such as in the case of a global shutter pixel.

(b) During a first row time (denoted Row1 in FIG. 12) pixel operations are performed for a first row of pixels 2 in the pixel array 8. The Row1 operations include reading sig1 from each of the pixels 2 of the first row of the pixel array 8 into the corresponding capacitor 92 of the corresponding column readout circuit 86 while resetting the amplifier 95 in each column readout circuit 86 and performing ADC autozero for the column ADC circuit 96 in each column readout circuit 86. The Row1 operations also include reading sig2 from each of the pixels 2 of the first row into the corresponding capacitor 92, amplifying the difference (sig1−sig2) in the amplifier 95 of the corresponding column readout circuit 86, and sampling the result to the corresponding column ADC circuit 96. The output from the pixels 2 in each row of the pixel array 8 is controlled by the row driver 429 using control signals to the pixels 2. The resetting of the amplifier 95 and the autozeroing of the column ADC circuit 96 in each column readout circuit 86 is controlled by the controller 485 using control signals in accordance with the readout scheme.

(c) During a second row time (denoted Row2 in FIG. 12) pixel operations are performed for pixels 2 of a second row of the pixel array 8, and analog-to-digital conversion is performed for the sampled difference signals from the first row of the pixel array 8. From the beginning of Row2, the image sensor 400 in various embodiments performs two parallel operations: (i) analog-to-digital conversion of the amplified and sample-and-held difference sig1−sig2 for the pixels 2 of the first row of the pixel array 8 by the corresponding column ADC circuits 96; and (ii) reading sig1 from the pixels 2 of the second row of the pixel array 8 while resetting the amplifier 95 in each column readout circuit 86 followed with reading sig2 from the pixels 2 of the second row and amplifying the difference sig1−sig2 for the pixels 2 of the second row in the amplifier 95 of the corresponding column readout circuit 86. At the end of the Row2, when the analog-to-digital conversion of each of the difference signals for the pixels 2 is row one is finished, the amplified difference of sig1−sig2 for each pixel 2 of the second row is sampled into the corresponding column ADC circuit 96. The output from the pixels 2 in each row of the pixel array 8 is controlled by the row driver 429 using control signals to the pixels 2. The controller 485 controls the sampling by each column ADC circuit 96, as well as the analog-to-digital conversion by each column ADC circuit 96 and the resetting of each amplifier 95, using control signals in accordance with the readout scheme.

(d) During the third row time (denoted Row3 in FIG. 12) and each row time thereafter up to a row time (RowN) for the last row of pixels 2 of the pixel array 8, the operations are performed as in Row2, but the sig1 and sig2 read from the pixel array 8 are read from the corresponding row in the pixel array (e.g., from the third row for Row3 and from the $N^{th}$ row for RowN, where N represents the total number of rows in the pixel array 8).

(e) During an $(N+1)^{th}$ row time (RowN+1), the analog-to-digital conversion of the amplified difference (sig1−sig2) for each of the pixels 2 of row N in the pixel array 8 is performed by the corresponding column ADC circuit 96. The controller 485 controls the analog-to-digital conversion by each column ADC circuit 96 using control signals in accordance with the readout scheme. The readout may then continue with another frame.

Figure 4B:
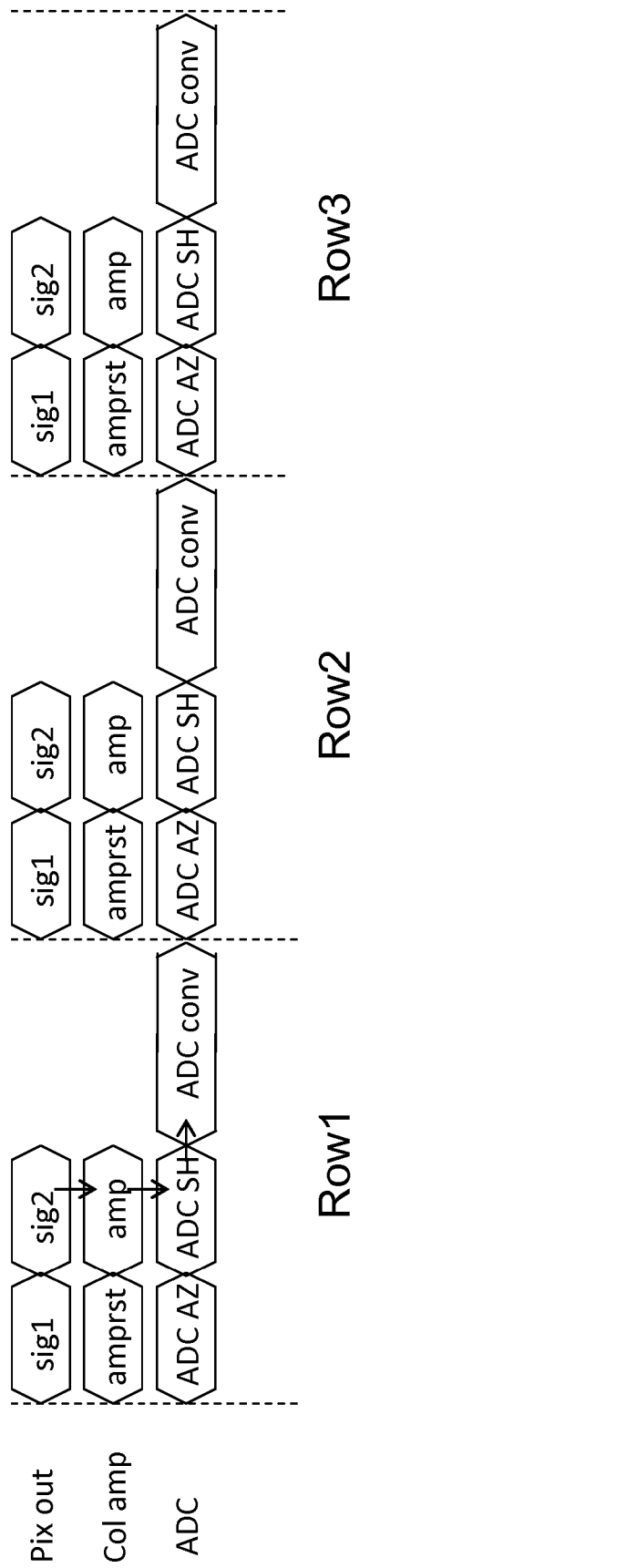
FIG. 4B is a generalized depiction of a related art column readout scheme.

Thus, image sensors and methods in accordance with various embodiments allow for sig1 and sig2 readout phases from pixels to be extended to last for one row time combined, so that pixel transfer time can be extended. In various embodiments, column ADC circuit autozeroing is removed from each row time and is performed only once a frame. For example, in some embodiments, column ADC circuit autozeroing is performed only in a first row time while resetting an amplifier for each column readout circuit. By removing column ADC circuit autozeroing from the row operations, analog-to-digital conversion may last considerably longer than a half of a row time. By comparing the pipelined readout scheme of FIG. 12, which is an embodiment of the present invention, with the readout scheme of FIG. 4B, it can be seen that the pipelined readout scheme of FIG. 12 allocates more time to the pixel operations and to the ADC operations than the readout scheme of FIG. 4B.

Figure 13A:
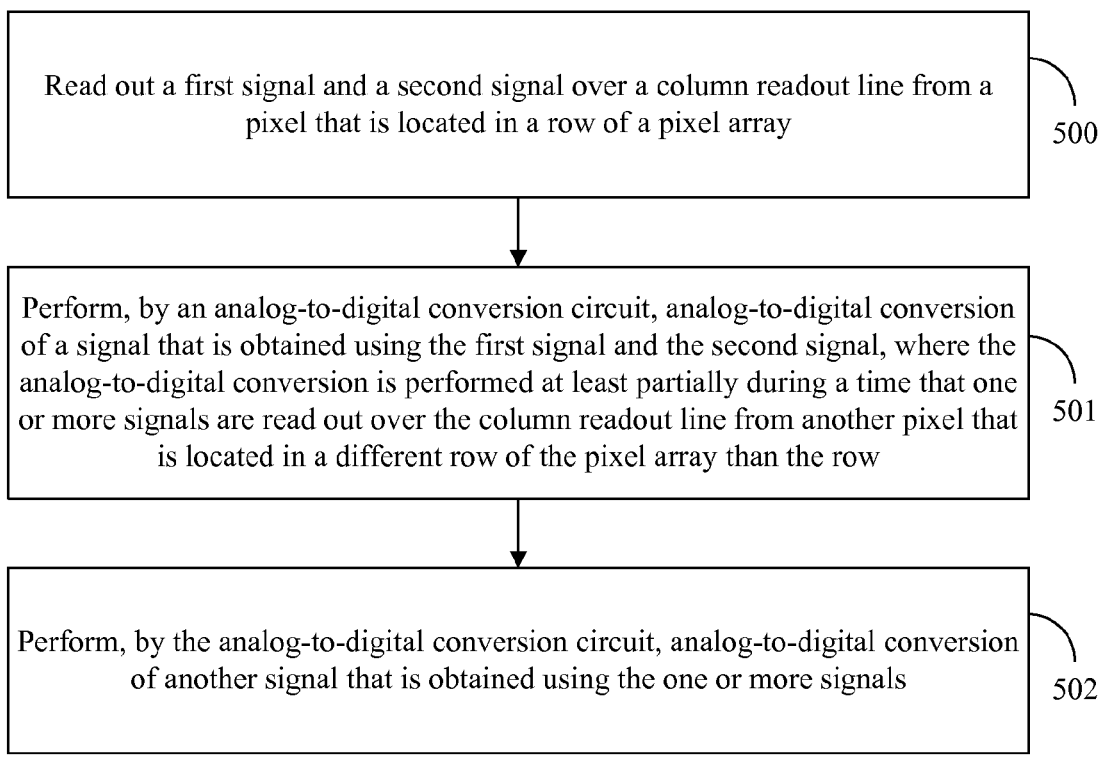
FIG. 13A illustrates a flowchart of a method for performing pipelined readout from an image sensor in accordance with an embodiment of the present invention.
Figure 13B:
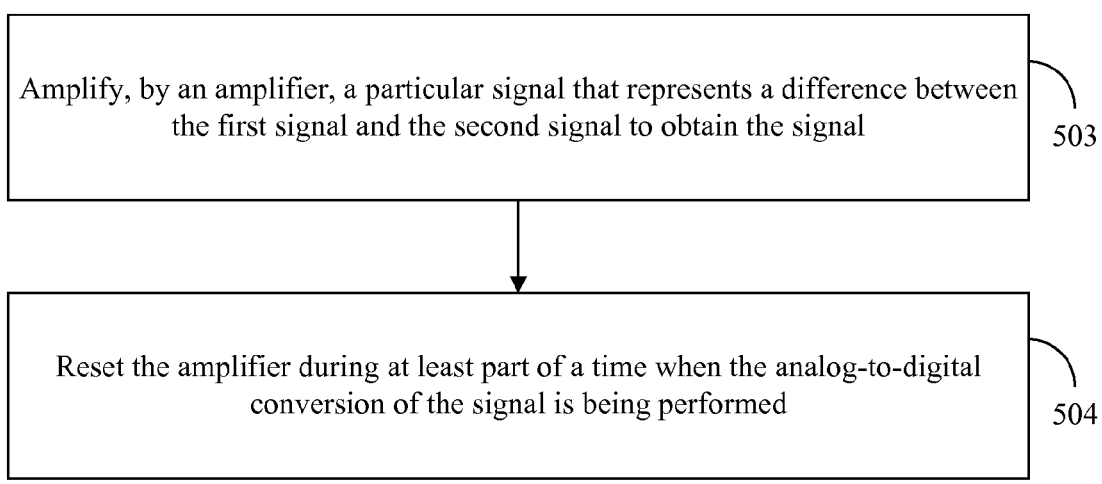
FIG. 13B illustrates a flowchart of a method that can be used with the method of FIG. 13A.

FIG. 13A illustrates a flowchart of a method for performing pipelined readout from an image sensor in accordance with an embodiment of the present invention. In 500, a first signal and a second signal are read out over a column readout line from a pixel that is located in a row of a pixel array. In 501, an analog-to-digital conversion circuit performs analog-to-digital conversion of a signal that is obtained using the first signal and the second signal, where the analog-to-digital conversion is performed at least partially during a time that one or more signals are read out over the column readout line from another pixel that is located in a different row of the pixel array than the row. In 502, the analog-to-digital conversion circuit performs analog-to-digital conversion of another signal that is obtained using the one or more signals. FIG. 13B illustrates a flowchart of a method that can be used with the method of FIG. 13A. In 503, an amplifier amplifies a particular signal that represents a difference between the first signal and the second signal to obtain the signal that is converted from analog to digital in 501. In 504, the amplifier is reset during at least part of a time when the analog-to-digital conversion of the signal is being performed.

Figure 14A:
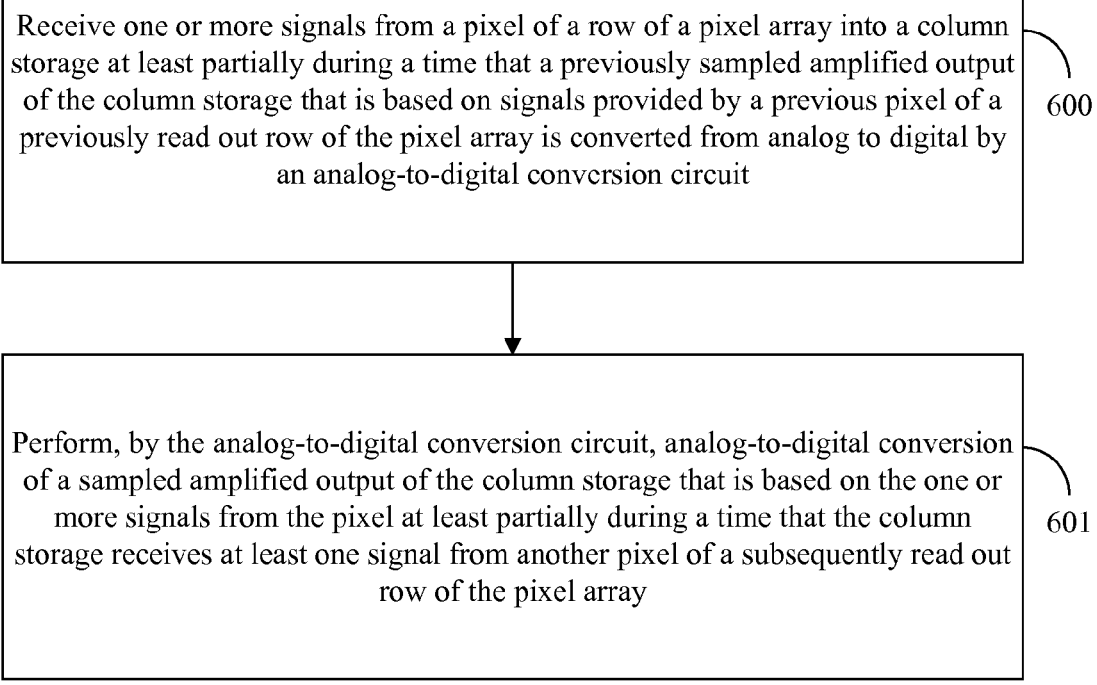
FIG. 14A illustrates a flowchart of a method for performing pipelined readout from an image sensor in accordance with an embodiment of the present invention.
Figure 14B:
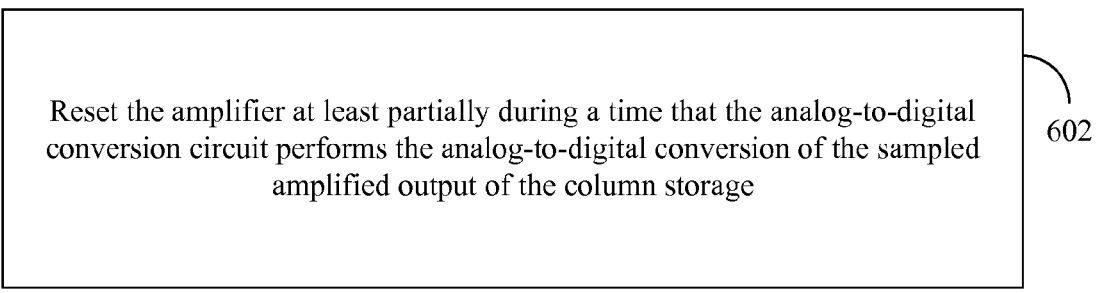
FIG. 14B illustrates a flowchart of a method that can be used with the method of FIG. 14A.

FIG. 14A illustrates a flowchart of a method for performing pipelined readout from an image sensor in accordance with an embodiment of the present invention. In 600, one or more signals are received from a pixel of a row of a pixel array into a column storage at least partially during a time that a previously sampled amplified output of the column storage that is based on signals provided by a previous pixel of a previously read out row of the pixel array is converted from analog to digital by an analog-to-digital conversion circuit. In 601, the analog-to-digital conversion circuit performs analog-to-digital conversion of a sampled amplified output of the column storage that is based on the one or more signals from the pixel at least partially during a time that the column storage receives at least one signal from another pixel of a subsequently read out row of the pixel array. In some embodiments, the column storage is a capacitor. Also, in some embodiments, amplification for the previously sampled amplified output of the column storage is provided by an amplifier that is connected between the column storage and the analog-to-digital conversion circuit. FIG. 14B illustrates a flowchart of a method that can be used with the method of FIG. 14A. In 602, the amplifier is reset at least partially during a time that the analog-to-digital conversion circuit performs the analog-to-digital conversion of the sampled amplified output of the column storage.

Figure 15A:
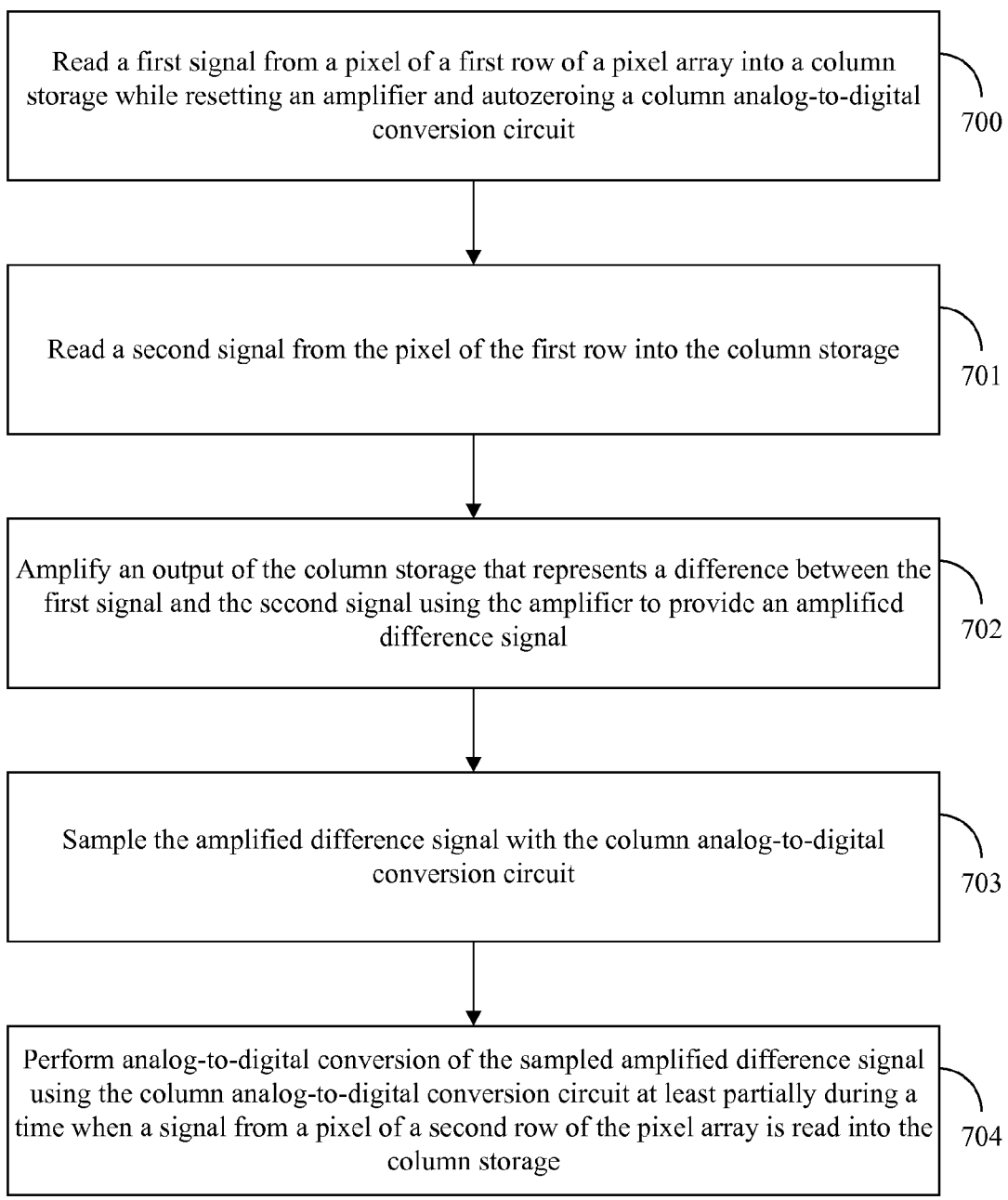
FIG. 15A illustrates a flowchart of a method for performing pipelined readout from an image sensor in accordance with an embodiment of the present invention.

FIG. 15A illustrates a flowchart of a method for performing pipelined readout from an image sensor in accordance with an embodiment of the present invention. In 700, a first signal is read from a pixel of a first row of a pixel array into a column storage while an amplifier is reset and a column analog-to-digital conversion circuit is autozeroed. In 701, a second signal is read from the pixel of the first row into the column storage. In 702, an output of the column storage that represents a difference between the first signal and the second signal is amplified using the amplifier to provide an amplified difference signal. In 703, the amplified difference signal is sampled with the column analog-to-digital conversion circuit. In 704, analog-to-digital conversion of the sampled amplified difference signal is performed using the column analog-to-digital conversion circuit at least partially during a time when a signal from a pixel of a second row of the pixel array is read into the column storage.

In some embodiments, a total time period for the reading of the first signal and the second signal from the pixel of the first row into the column storage is equal to one row time period, and the analog-to-digital conversion of the sampled amplified difference signal lasts for longer than one-half of the row time period. In some embodiments, signals from pixels in the pixel array are read out row by row during one frame, and the autozeroing of the column analog-to-digital conversion circuit is performed only once per frame. FIG. 15B illustrates a flowchart of a method that can be used with the method of FIG. 15A. In 705, the amplifier is reset during a time when the column analog-to-digital conversion circuit performs the analog-to-digital conversion of the sampled amplified difference signal.

FIG. 15C illustrates a flowchart of a method that can be used with the method of FIG. 15A. In 706, the amplifier is used to amplify a second output of the column storage that represents a difference between signals read from the pixel of the second row of the pixel array to provide a second amplified difference signal. In 707, the second amplified difference signal is sampled with the column analog-to-digital conversion circuit. In 708, analog-to-digital conversion of the sampled second amplified difference signal is performed using the column analog-to-digital conversion circuit at least partially during a time when another signal from a pixel of a third row of the pixel array is read into the column storage.

An image sensor in accordance with an embodiment includes a pixel array, a column readout circuit, and a controller. The pixel array includes a plurality of pixels arranged in a plurality of rows and a plurality of columns. The column readout circuit includes an amplifier, a column storage connected to an input of the amplifier, and an analog-to-digital conversion circuit connected to an output of the amplifier. The controller is configured to control the column readout circuit such that at least partially during a time that one or more signals are read from a pixel of a row of the pixel array into the column storage a previously sampled amplified output of the column storage that is based on signals provided by a previous pixel of a previously read out row of the pixel array is converted from analog to digital by the analog-to-digital conversion circuit.

In various embodiments, the column storage is a capacitor. In some embodiments, the controller is configured to control the column readout circuit such that the analog-to-digital conversion circuit performs analog-to-digital conversion of a sampled amplified output of the column storage that is based on the one or more signals from the pixel at least partially during a time that the column storage receives at least one signal from a another pixel of a subsequently read out row of the pixel array. In various embodiments, the controller is configured to reset the amplifier and autozero the analog-to-digital conversion circuit at least partially during a time that a first signal from a pixel of a first row of the pixel array is read into the column storage.

In some embodiments, signals from pixels in the pixel array are read out row by row during one frame, and the controller is configured to control the column readout circuit such that the autozeroing of the analog-to-digital conversion circuit is performed only once per frame. In various embodiments, a total time period for the reading of the one or more signals from the pixel of the row of the pixel array into the column storage is equal to one row time period, and the controller is configured to control the column readout circuit such that the analog-to-digital conversion of the previously sampled amplified output of the column storage lasts for longer than one-half of the row time period. In some embodiments, the controller is configured to reset the amplifier during a time when the analog-to-digital conversion circuit performs the analog-to-digital conversion of the previously sampled amplified output of the column storage.

In various embodiments, the controller is configured to control the analog-to-digital conversion circuit to perform analog-to-digital conversion of a signal representative of signals output from a pixel in a last row of the pixel array during a time when no signals are read out from the pixel array into the column storage. In some embodiments, the analog-to-digital conversion circuit is controllable by the controller to sample and hold an output of the amplifier. Also, in some embodiments, the column storage is a capacitor that is connected to a column readout line for receiving signals from all pixels in a column of the pixel array.

Various embodiments of the present invention include circuits and methods to extend time for pixel operations. A method in accordance with an embodiment of the present invention allows for extending a pixel operation time. In various embodiments, a pixel operation time is extended by up to one line time. Also, in various embodiments, a pixel operation time is extended by utilizing an additional column capacitor storage.

A method in accordance with an embodiment of the present invention comprises reading out signals from a pixel array line by line where pixel operations for pixels in a row of the pixel array that are started during one line time interval are continued to a second line time interval and overlap with pixel operations for pixels in a next row of the pixel array. In various embodiments, the reading out of the signals is performed utilizing two alternating storages for each column of the pixel array. In some embodiments, the pixel operations include at least one of pixel reset or pixel charge transfer. In various embodiments, the method further comprises performing analog-to-digital conversion of analog signals obtained from the signals.

An image sensor in accordance with an embodiment of the present invention comprises a pixel array, a plurality of column readout lines, and a plurality of column readout circuits.

The pixel array comprises a plurality of pixels arranged in a plurality of rows and a plurality of columns. Each column readout line of the plurality of column readout lines is connected to a corresponding at least two pixels of the plurality of pixels. Each column readout circuit of the plurality of column readout circuits is connected to a corresponding column readout line of the plurality of column readout lines, and comprises an amplifier, a first capacitor connected between the corresponding column readout line and an input of the amplifier, and a second capacitor connected between the corresponding column readout line and the input of the amplifier.

In various embodiments, each column readout circuit of the plurality of column readout circuits further comprises a first switch connected between the corresponding column readout line and the first capacitor. Also, in various embodiments, each column readout circuit of the plurality of column readout circuits further comprises a second switch connected between the corresponding column readout line and the second capacitor. In some embodiments, the image sensor further comprises a controller configured to provide a first signal to control the first switch of each of one or more of the plurality of column readout circuits, and configured to provide a second signal to control the second switch of each of the one or more of the plurality of column readout circuits.

In various embodiments, the controller is configured to control the first switch of each of the one or more of the plurality of column readout circuits to be closed and to control the second switch of each of the one or more of the plurality of column readout circuits to be open in a case where pixels of the plurality of pixels that are in a particular row of the plurality of rows provide output on corresponding ones of the plurality of column readout lines. Also, in various embodiments, the controller is configured to control the first switch of each of the one or more of the plurality of column readout circuits to be open and to control the second switch of each of the one or more of the plurality of column readout circuits to be closed in a case where pixels of the plurality of pixels that are in certain row of the plurality of rows provide output on corresponding ones of the plurality of column readout lines.

In some embodiments, each pixel of the plurality of pixels comprises a photodiode, a transfer transistor, a sense node, and a row select transistor. Also, in some embodiments, each column readout circuit of the plurality of column readout circuits further comprises a column analog-to-digital conversion (ADC) circuit connected to an output of the amplifier. In various embodiments, the image sensor further comprises a row driver that is configured to control the transfer transistor of each pixel of the plurality of pixels in a particular row of the plurality of rows to allow for charge to pass from the photodiode of the pixel to the sense node of the pixel while the plurality of column readout circuits perform analog-to-digital conversion for signals output from pixels in another row of the plurality of rows.

An image sensor in accordance with an embodiment of the present invention comprises a pixel connected to provide output on a column readout line, an amplifier, a first capacitor connected between a column readout line and an input of the amplifier, and a second capacitor connected between the column readout line and the input of the amplifier. In various embodiments, the image sensor further comprises a first switch connected between the column readout line and the first capacitor. Also, in various embodiments, the image sensor further comprises a second switch connected between the column readout line and the second capacitor.

In various embodiments, the image sensor further comprises a controller that is configured to provide a first signal to control the first switch and that is configured to provide a second signal to control the second switch. In some embodiments, the image sensor further comprises a second pixel connected to provide output on the column readout line. Also, in some embodiments, the controller is configured to control the first switch to be closed and to control the second switch to be open in a case where the pixel provides output on the column readout line, and the controller is configured to control the first switch to be open and to control the second switch to be closed in a case where the second pixel provides output on the column readout line.

In various embodiments, the image sensor further comprises a second pixel connected to provide output on the column readout line, a row driver configured to control a transfer transistor of the second pixel for transferring charge from a photodiode of the second pixel to a sense node of the second pixel, and configured to control a row select transistor of the pixel for causing the pixel to provide output on the column readout line, and a column ADC circuit connected to an output of the amplifier. Also, in various embodiments, the row driver is configured to control the transfer transistor of the second pixel to cause charge to be transferred from the photodiode of the second pixel to the sense node of the second pixel while the column ADC circuit performs analog-to-digital conversion of output from the pixel.

A method in accordance with an embodiment of the present invention is performed in an image sensor. In various embodiments, the image sensor comprises a first pixel connected to provide output on a column readout line, a second pixel connected to provide output on the column readout line, a column storage, and an additional column storage. In various embodiments, the method comprises sampling a reset value of the first pixel into the column storage, sampling a reset value of the second pixel into the additional column storage after the sampling of the reset value of the first pixel into the column storage, starting a charge transfer process in the second pixel from a photodiode of the second pixel to a sense node of the second pixel, providing a signal value of the first pixel to the column storage after the sampling of the reset value of the second pixel into the additional column storage, and performing analog-to-digital conversion of a difference between the signal value of the first pixel and the reset value of the first pixel at least partially during a same time as the charge transfer process in the second pixel.

In some embodiments, the method further comprises providing output from the column storage to an amplifier, and providing output from the additional column storage to the amplifier. In some embodiments, the sampling of the reset value of the first pixel comprises closing a first switch between the column readout line and the column storage. Also, in some embodiments, the sampling of the reset value of the second pixel comprises closing a second switch between the column readout line and the additional column storage. In various embodiments, the method further comprises terminating the charge transfer process in the second pixel after performing the analog-to-digital conversion of the difference between the signal value of the first pixel and the reset value of the first pixel.

A column readout circuit in accordance with an embodiment of the present invention comprises an amplifier, a column storage, connected to the amplifier, for storing signals output from particular pixels of a column of a pixel array, and an additional column storage, connected to the amplifier, for storing signals output from different pixels of the column of the pixel array than the particular pixels. In various embodiments, the column readout circuit further comprises a column ADC circuit connected to an output of the amplifier. Also, in various embodiments, the column readout circuit further comprises a first switch connected between a column readout line and the column storage, and a second switch connected between the column readout line and the additional column storage.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. Various modifications and changes that come within the meaning and range of equivalency of the claims are intended to be within the scope of the invention.

What is claimed is:

1. A method, comprising:
    reading out a first signal and a second signal over a column readout line from a pixel that is located in a row of a pixel array;
    performing, by an analog-to-digital conversion circuit, analog-to-digital conversion of a signal that is obtained using the first signal and the second signal, the analog-to-digital conversion performed at least partially during a time that one or more signals are read out over the column readout line from another pixel that is located in a different row of the pixel array than said row;
    performing, by said analog-to-digital conversion circuit, analog-to-digital conversion of another signal that is obtained using said one or more signals;
    amplifying, by an amplifier, a particular signal that represents a difference between the first signal and the second signal to obtain said signal; and
    resetting said amplifier during at least part of a time when the analog-to-digital conversion of said signal is being performed.

2. A pipelined readout method in an image sensor, the method comprising:
    receiving one or more signals from a pixel of a row of a pixel array into a column storage at least partially during a time that a previously sampled amplified output of the column storage that is based on signals provided by a previous pixel of a previously read out row of the pixel array is converted from analog to digital by an analog-to-digital conversion circuit; and
    performing, by the analog-to-digital conversion circuit, analog-to-digital conversion of a sampled amplified output of the column storage that is based on the one or more signals from the pixel at least partially during a time that the column storage receives at least one signal from another pixel of a subsequently read out row of the pixel array;
    wherein amplification for the previously sampled amplified output of the column storage is provided by an amplifier that is connected between the column storage and the analog-to-digital conversion circuit; and
    wherein the method further includes resetting the amplifier at least partially during a time that the analog-to-digital conversion circuit performs the analog-to-digital conversion of the sampled amplified output of the column storage.

3. A method, comprising:
    reading a first signal from a pixel of a first row of a pixel array into a column storage while resetting an amplifier and autozeroing a column analog-to-digital conversion circuit;
    reading a second signal from the pixel of the first row into the column storage;
    amplifying an output of the column storage that represents a difference between the first signal and the second signal using the amplifier to provide an amplified difference signal;
    sampling the amplified difference signal with the column analog-to-digital conversion circuit;
    performing analog-to-digital conversion of the sampled amplified difference signal using the column analog-to-digital conversion circuit at least partially during a time when a signal from a pixel of a second row of the pixel array is read into the column storage.

4. The method of claim 3, further comprising:
    resetting the amplifier during a time when the column analog-to-digital conversion circuit performs the analog-to-digital conversion of the sampled amplified difference signal.

5. The method of claim 3,
    wherein a total time period for the reading of the first signal and the second signal from the pixel of the first row into the column storage is equal to one row time period; and
    wherein the analog-to-digital conversion of the sampled amplified difference signal lasts for longer than one-half of the row time period.

6. The method of claim 3,
    wherein signals from pixels in the pixel array are read out row by row during one frame; and
    wherein the autozeroing of the column analog-to-digital conversion circuit is performed only once per frame.

7. The method of claim 3, further comprising:
    amplifying, using the amplifier, a second output of the column storage that represents a difference between signals read from the pixel of the second row of the pixel array to provide a second amplified difference signal;
    sampling the second amplified difference signal with the column analog-to-digital conversion circuit; and
    performing analog-to-digital conversion of the sampled second amplified difference signal using the column analog-to-digital conversion circuit at least partially during a time when another signal from a pixel of a third row of the pixel array is read into the column storage.

* * * * *